(12) United States Patent
Tucker et al.

(10) Patent No.: US 12,005,689 B2
(45) Date of Patent: Jun. 11, 2024

(54) FILMS AND BAGS HAVING LOW-FORCE EXTENSION PATTERNS

(71) Applicant: THE GLAD PRODUCTS COMPANY, Oakland, CA (US)

(72) Inventors: Edward B. Tucker, Willowbrook, IL (US); Robert T. Dorsey, Willowbrook, IL (US); Michael G. Borchardt, Naperville, IL (US); Ranyi Zhu, Naperville, IL (US); Zeljko Vidovic, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 453 days.

(21) Appl. No.: 16/761,209

(22) PCT Filed: Nov. 2, 2018

(86) PCT No.: PCT/US2018/059008
§ 371 (c)(1),
(2) Date: May 1, 2020

(87) PCT Pub. No.: WO2019/094299
PCT Pub. Date: May 16, 2019

(65) Prior Publication Data
US 2020/0282685 A1    Sep. 10, 2020

Related U.S. Application Data

(60) Provisional application No. 62/583,108, filed on Nov. 8, 2017.

(51) Int. Cl.
*B31B 70/00*   (2017.01)
*B29C 55/08*   (2006.01)
(Continued)

(52) U.S. Cl.
CPC ............... *B32B 3/28* (2013.01); *B29C 55/08* (2013.01); *B29C 55/18* (2013.01); *B29D 7/01* (2013.01);
(Continued)

(58) Field of Classification Search
CPC .. B32B 1/02; B32B 3/26; B32B 3/263; B32B 3/28; B32B 3/30; B32B 2250/02;
(Continued)

(56) References Cited

U.S. PATENT DOCUMENTS 5,205,650 A * 4/1993 Rasmussen ............ B64D 17/02
                                                      428/167
5,518,801 A * 5/1996 Chappell ........... A61F 13/51476
                                                      428/167

(Continued)

FOREIGN PATENT DOCUMENTS

CN          1402684 A       3/2003

OTHER PUBLICATIONS

Office Action as received in Chinese application 201880083557.2 dated Nov. 3, 2022 [no English translation available].
(Continued)

*Primary Examiner* — Yan Lan
(74) *Attorney, Agent, or Firm* — Keller Preece PLLC

(57) ABSTRACT

A thermoplastic film which exhibits elastic-like behavior along at least one axis when stretched or elongated and then released. The thermoplastic film comprises a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and plurality of web areas are arranged in a complex pattern. The complex pattern provides visual and tactile cues as the films are
(Continued)

stretched or elongated. The complex pattern can cause the thermoplastic film to have a low force extension.

20 Claims, 21 Drawing Sheets

(51) Int. Cl.
| | |
|---|---|
| B29C 55/18 | (2006.01) |
| B29D 7/01 | (2006.01) |
| B31B 70/88 | (2017.01) |
| B32B 3/28 | (2006.01) |
| B32B 3/30 | (2006.01) |
| B32B 27/08 | (2006.01) |
| B65D 65/40 | (2006.01) |
| B65F 1/00 | (2006.01) |
| B31B 70/86 | (2017.01) |
| B31B 155/00 | (2017.01) |
| B31B 170/20 | (2017.01) |
| B32B 7/05 | (2019.01) |
| B32B 37/00 | (2006.01) |

(52) U.S. Cl.
CPC .......... *B31B 70/008* (2017.08); *B31B 70/88* (2017.08); *B32B 3/30* (2013.01); *B32B 27/08* (2013.01); *B65D 65/403* (2013.01); *B65F 1/0006* (2013.01); *B31B 70/866* (2017.08); *B31B 2155/0014* (2017.08); *B31B 2155/002* (2017.08); *B31B 2170/20* (2017.08); *B32B 7/05* (2019.01); *B32B 37/0038* (2013.01); *B32B 2274/00* (2013.01); *B32B 2307/7145* (2013.01); *B65F 2250/114* (2013.01)

(58) Field of Classification Search
CPC ............ B32B 2250/24; B32B 2307/54; B32B 2439/06; B32B 27/205; B32B 7/05; B32B 7/12; B65D 65/40; B65D 65/403; B65D 65/406; B65D 65/44; B65F 1/0006; B65F 2250/114; B29C 55/08; B29C 55/18; B29D 7/01; B31B 70/008; B31B 70/88; B31B 2155/0014; B31B 2155/002; B31B 2170/20; B31B 70/866; B31F 2201/00; B31F 2201/0741; B31F 2201/0751; B31F 2201/0764

See application file for complete search history.

(56) References Cited

U.S. PATENT DOCUMENTS

| | | | |
|---|---|---|---|
| 2002/0003910 A1* | 1/2002 | Jackson | B65D 33/00 |
| | | | 383/118 |
| 2012/0063706 A1 | 3/2012 | Fraser et al. | |
| 2014/0023829 A1 | 1/2014 | Broering et al. | |
| 2016/0235592 A1 | 8/2016 | Coe et al. | |
| 2016/0271864 A1 | 9/2016 | Dorsey et al. | |
| 2017/0113872 A1* | 4/2017 | Cobler | B29C 59/04 |

OTHER PUBLICATIONS

International Search Report & Written Opinion as received in PCT/US18/59008 dated Jan. 22, 2019.
Office Action as received in Chinese application 201880083557.2 dated Jan. 14, 2022 [no English translation available].
Office Action as received in Chinese application 201880083557.2 dated Apr. 14, 2023 [no English translation available].
Examination Report as received in AU application 2018365773 dated Oct. 18, 2023.

* cited by examiner

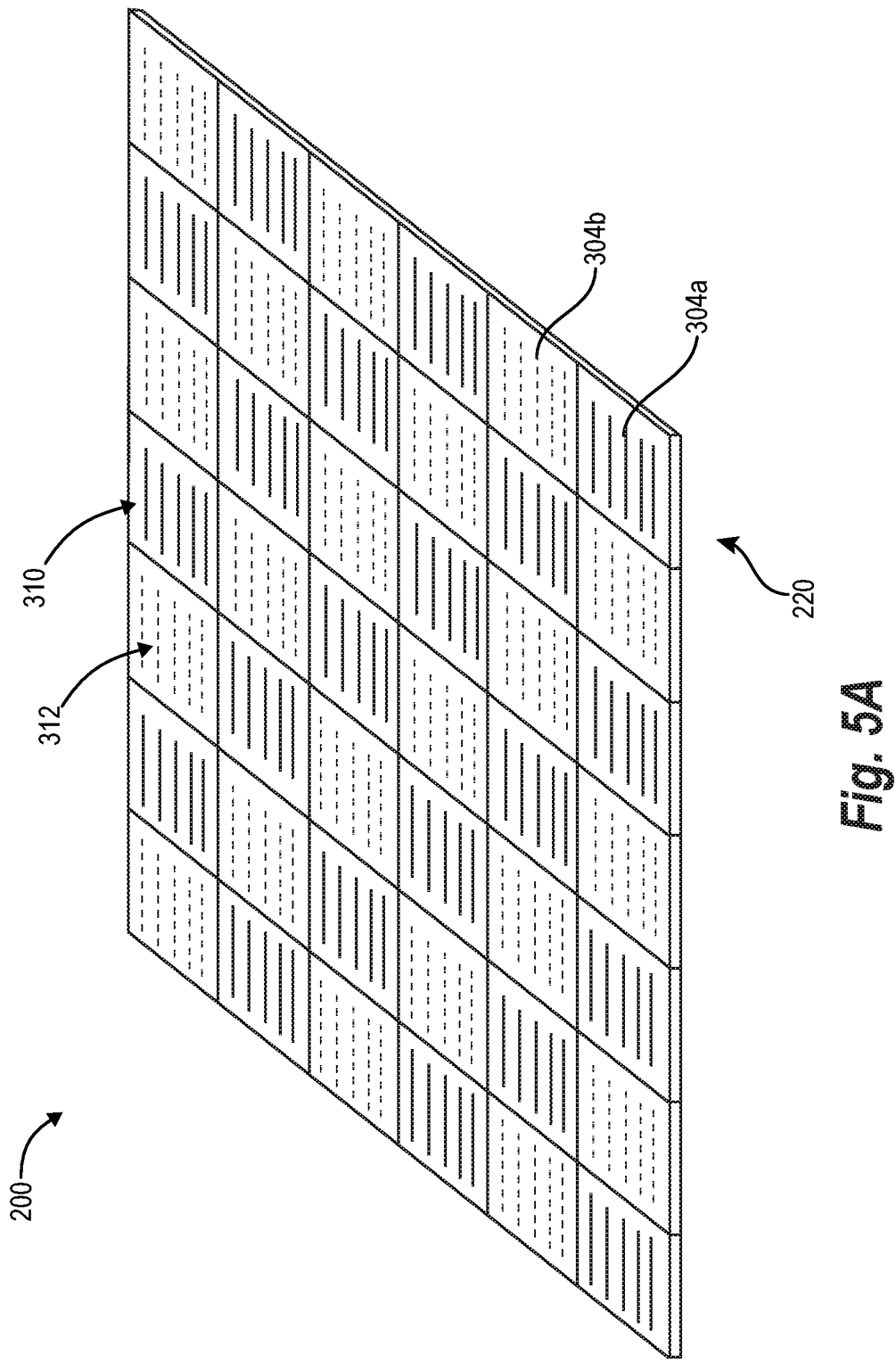

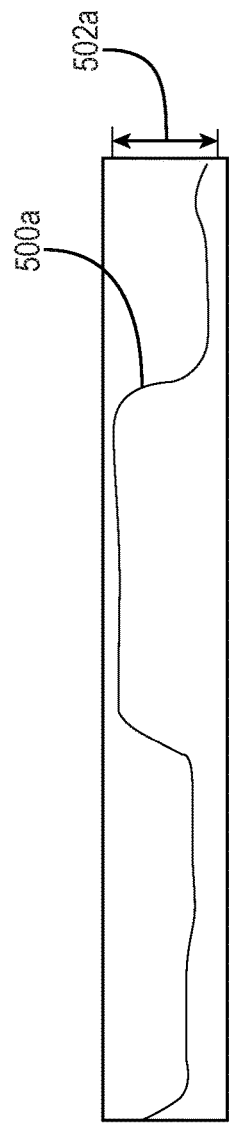
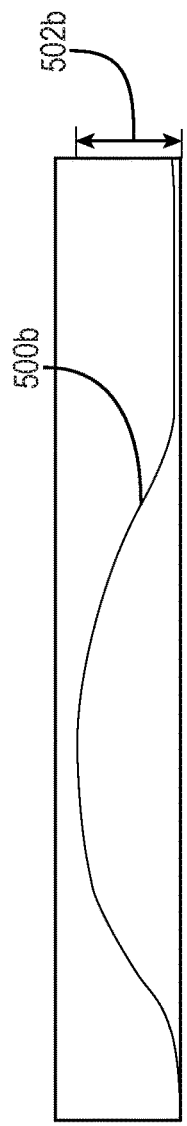
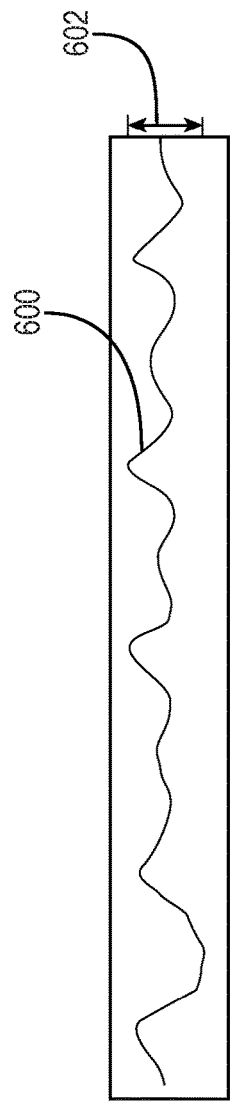
Fig. 6A
Fig. 6B
Fig. 6C
(Prior Art)

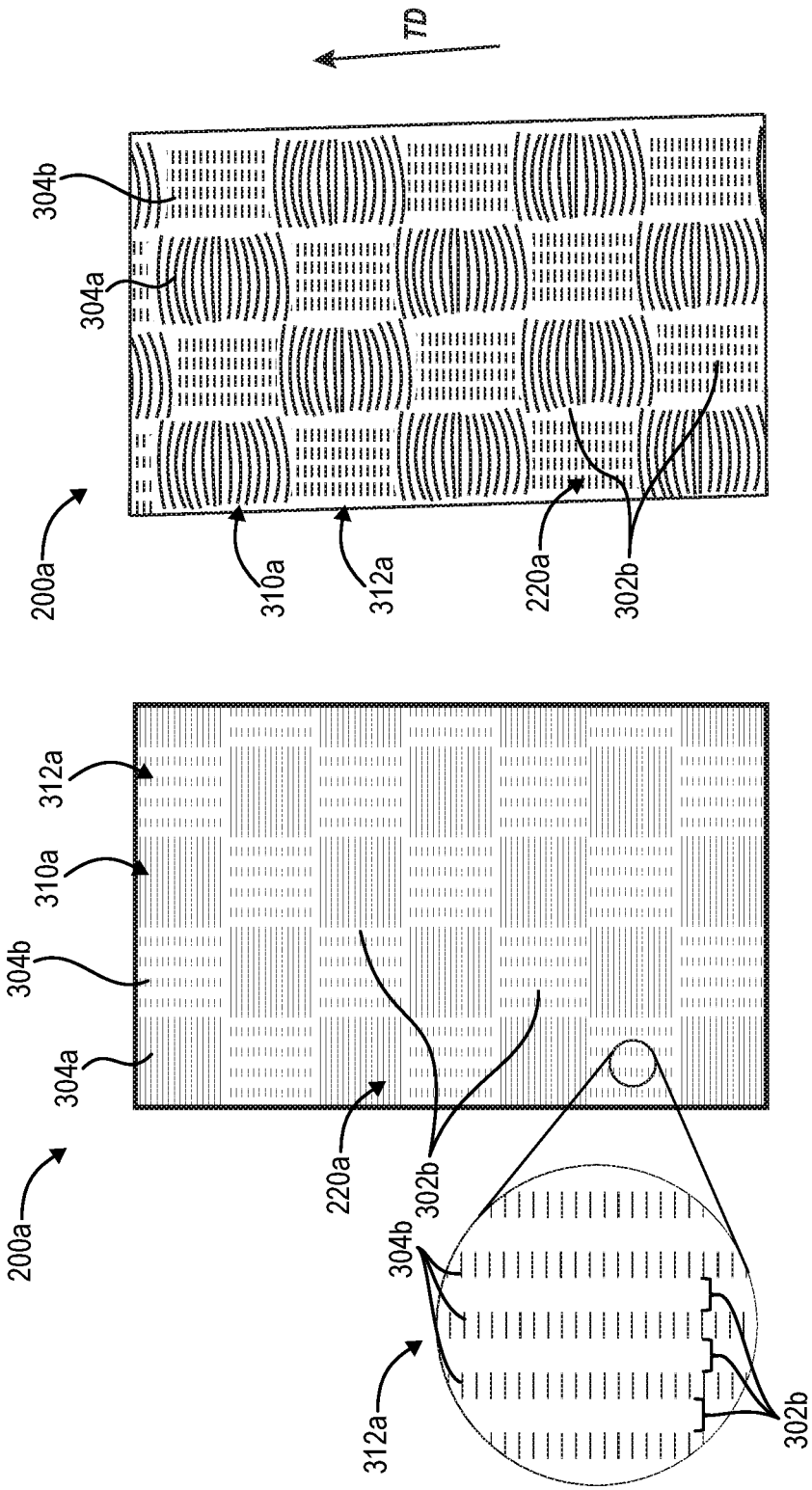

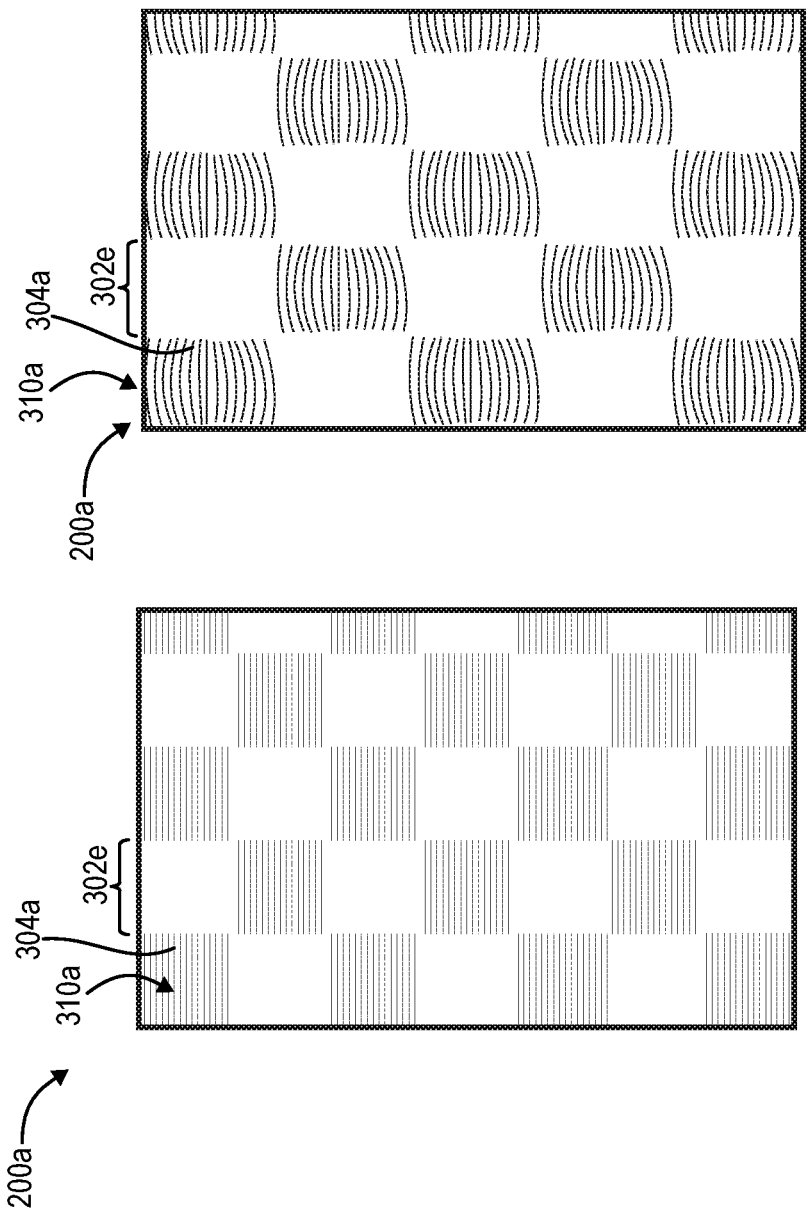

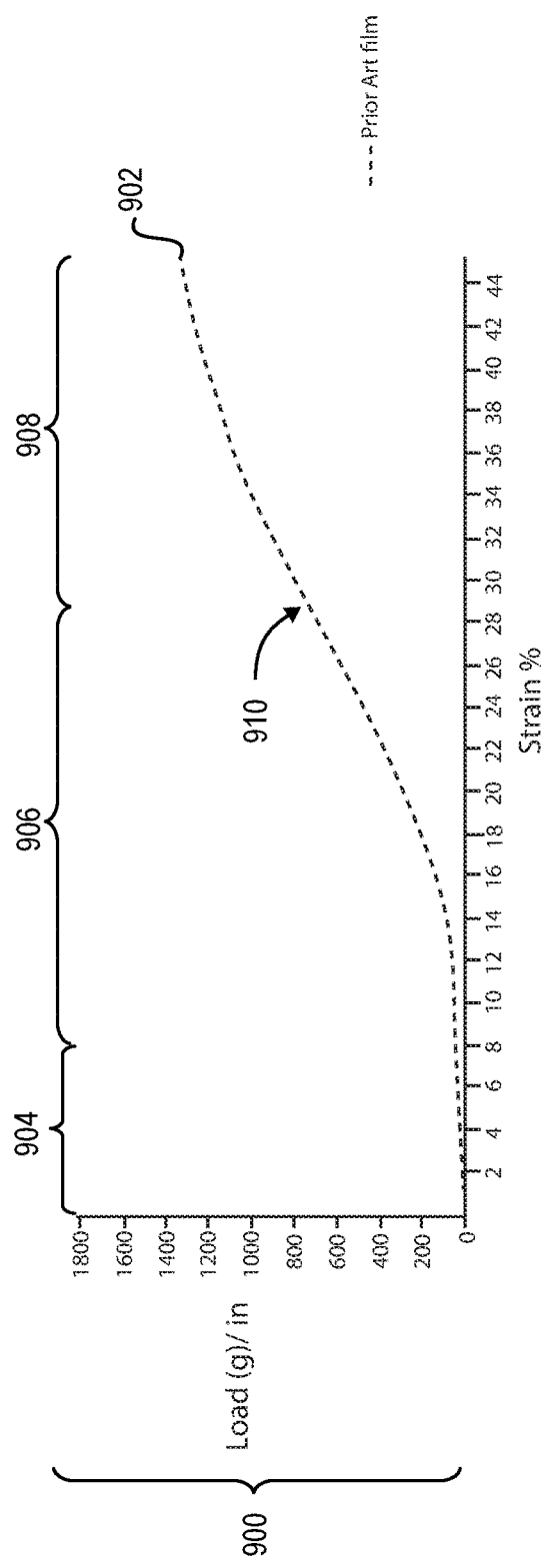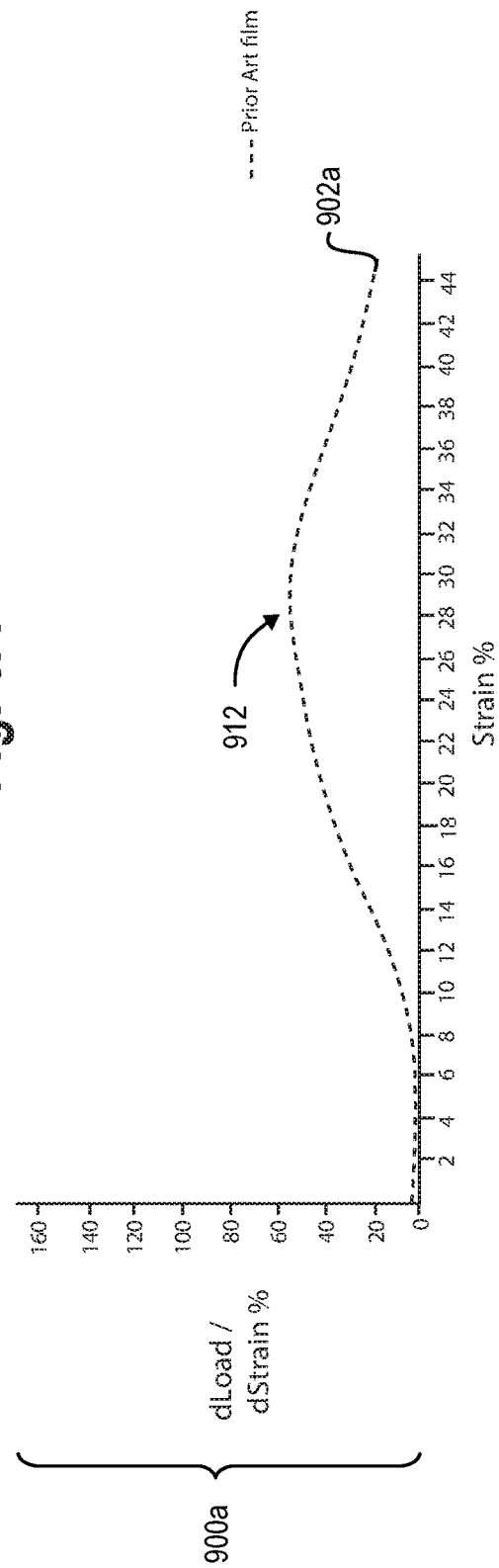

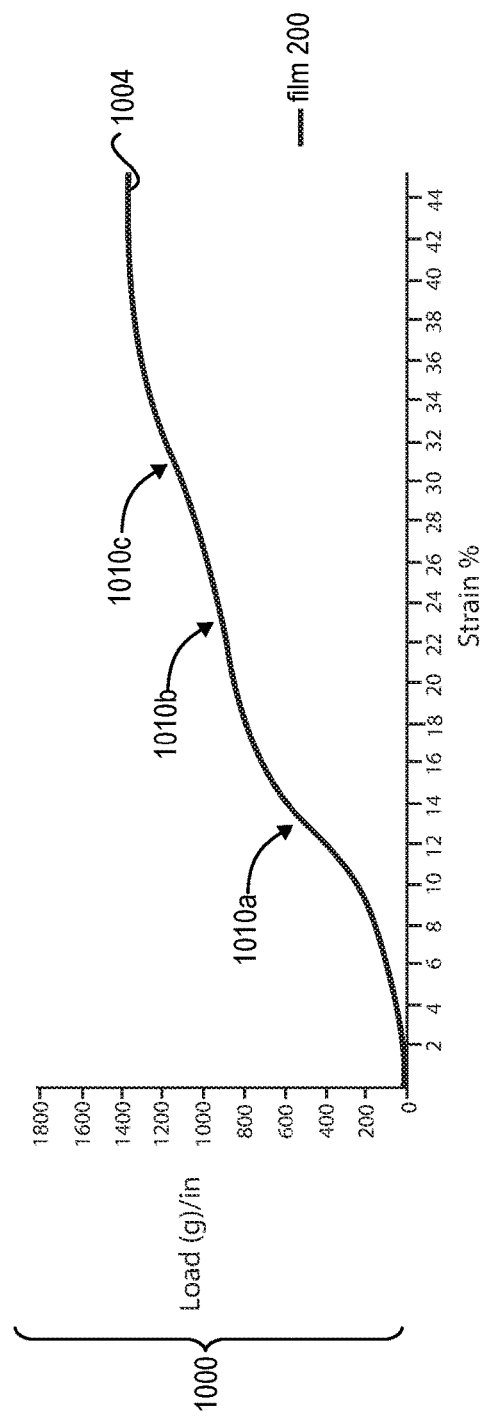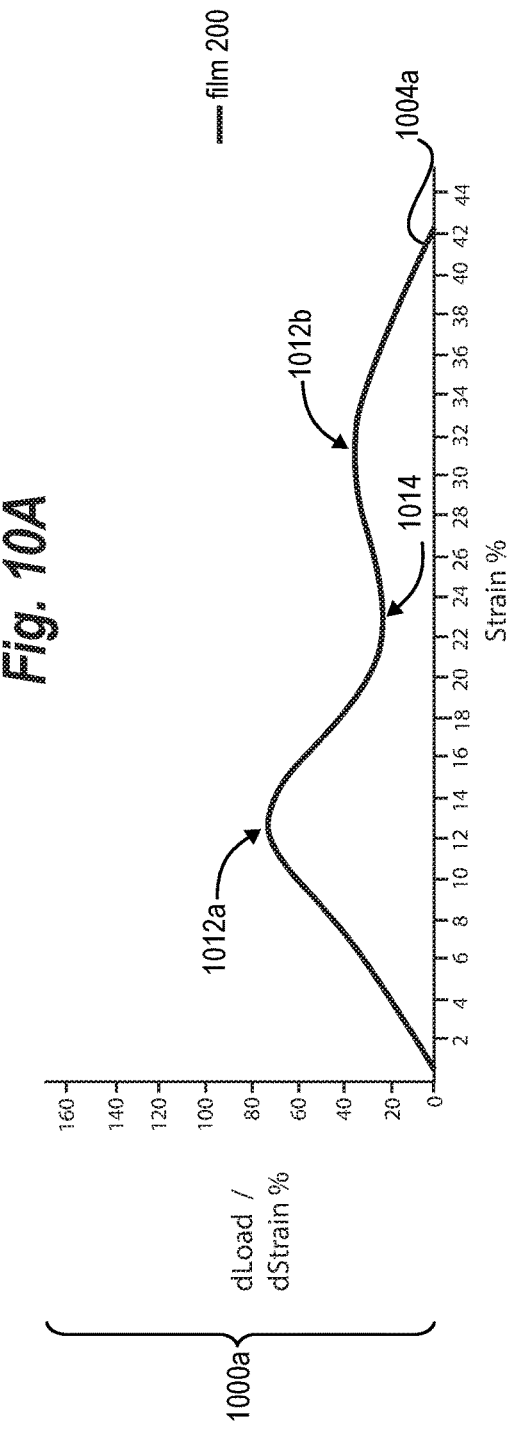
Fig. 10A
Fig. 10B

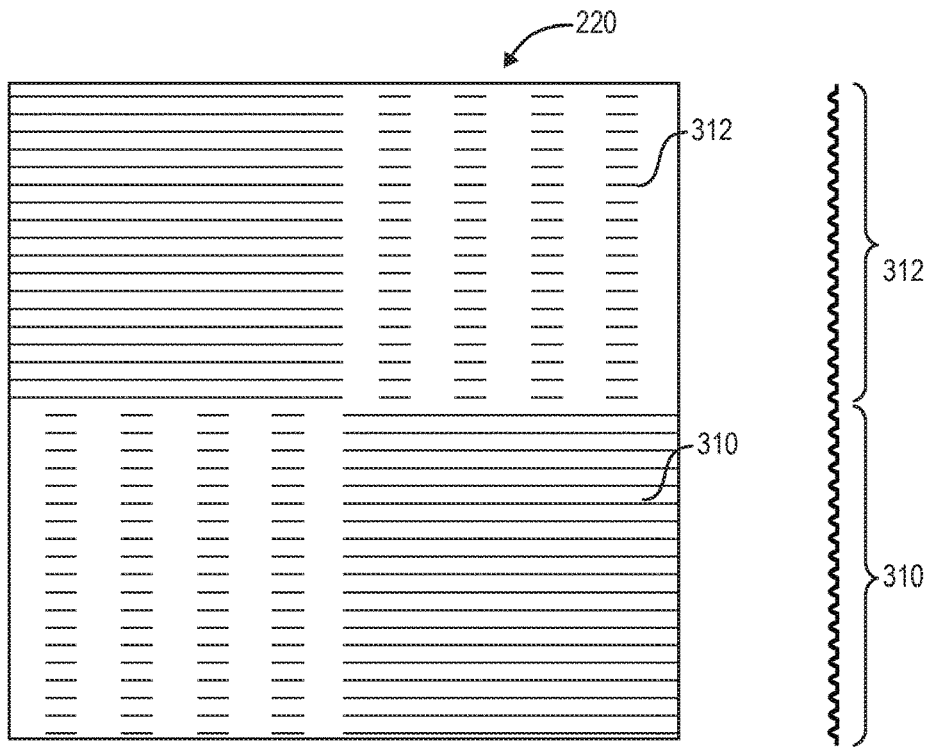
*Fig. 11D*  *Fig. 11E*
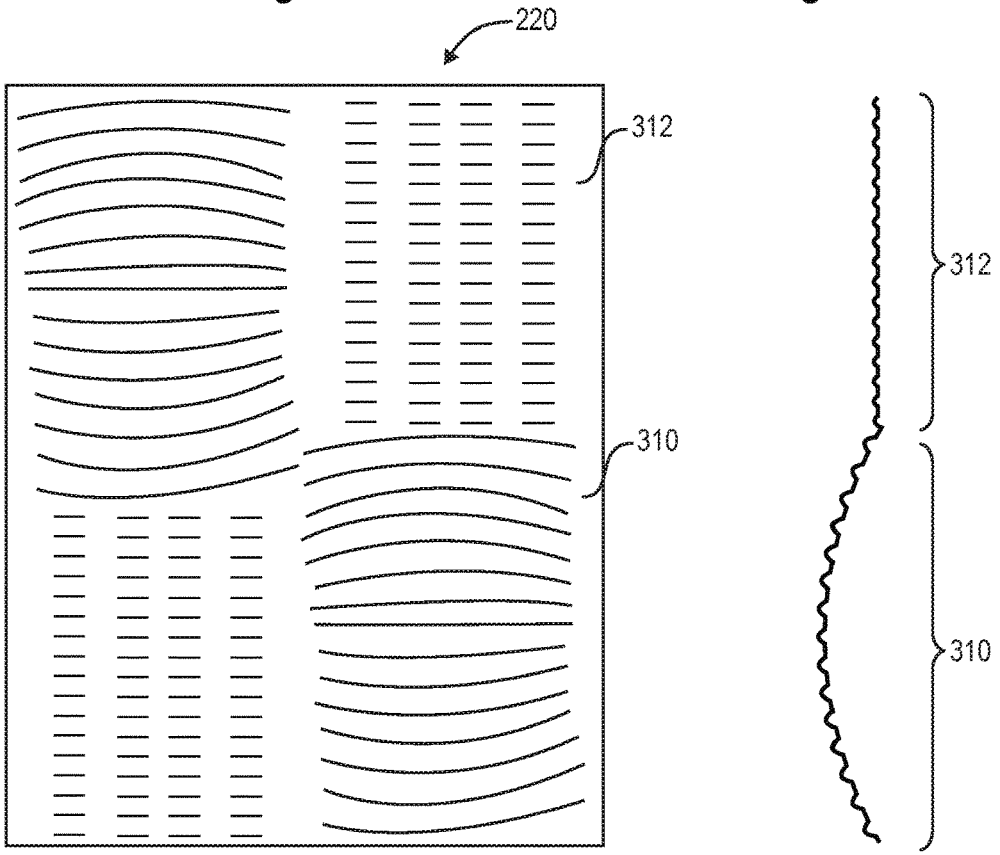
*Fig. 11F*  *Fig. 11G*

FILMS AND BAGS HAVING LOW-FORCE EXTENSION PATTERNS

CROSS-REFERENCE TO RELATED APPLICATIONS

The present application claims the benefit of and priority to U.S. Provisional Application No. 62/583,108, filed Nov. 8, 2017 and entitled: THERMOPLASTIC FILMS AND BAGS WITH COMPLEX STRETCH PATTERNS AND METHODS OF MAKING THE SAME. The contents of the above-referenced application are hereby incorporated by reference in their entirety.

BACKGROUND

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, some attempt to control manufacturing costs by decreasing the amount of thermoplastic material in a product. One-way manufacturers may attempt to reduce production costs is to stretch the thermoplastic film, thereby increasing its surface area and reducing the amount of thermoplastic film needed to produce a product of a given size.

While thinner gauge materials can represent cost savings to the manufacturer, the use of thinner gauge films can result in lower durability. Although some recent technology may, in some cases at least, result in relatively thinner gauge films that may be as strong as their thicker counterparts, customers naturally sense from prior experience that thinner gauge materials are lower in quality and durability.

For example, some cues to a customer of lower quality and durability of a film are how thick or thin the film feels and how thin or weak the film "looks." Customers tend to view thin looking or feeling films as having relatively low strength. Thus, even though some mechanisms can improve some aspects of film strength while using a thinner gauge, the look and feel of such films tend to cause customers to believe the film is nevertheless low quality.

To provide additional strength and flexibility, some manufacturers seek to provide thermoplastic films with elastic-like behavior by adding elastic materials or using specialized processing of the films. While elastic-like behavior provides various advantages, how easily a film stretches can connote to a consumer a level of strength. For example, films that stretch easily can signal to a user that the film is weak and will likely fail quickly.

Accordingly, there are various considerations to be made with regard to thermoplastic films and products formed therefrom.

BRIEF SUMMARY

One or more implementations of the present disclosure solve one or more problems in the art with thermoplastic films with complex stretch patterns that provide low force extension and apparatus and methods for creating the same. The complex stretch patterns provide visual and tactile cues as the films are stretched/elongated. In one or more implementations. the complex stretch pattern causes first portions of the thermoplastic film to deform though expansion in the direction of an applied force while second portions resist deformation in the direction of the applied force. Additionally, one or more implementations the difference in deformation between first and second portions can cause the first portions billow when stretched/elongated and subsequently released thereby providing the film with greater loft.

One or more implementations of the present disclosure includes a thermoplastic film with one or more strainable networks formed by a structural elastic like process. The thermoplastic film includes a plurality of raised rib-like elements and a plurality of land areas positioned about the plurality of raised rib-like elements. The plurality of land areas extend in a first direction. The plurality of raised rib-like elements and the plurality of land areas are sized and positioned such that, when subjected to the applied force in a direction a parallel to the first direction, the thermoplastic film provides a low force extension.

One or more additional implementations include a thermoplastic bag exhibiting low force extension. The thermoplastic bag includes a first sidewall and a second sidewall joined together along a first side edge, a second side edge, a bottom edge. The thermoplastic bag also includes an opening opposite the bottom edge. The thermoplastic bag further includes a plurality of raised rib-like elements formed in the first and second sidewalls. The plurality of raised rib-like elements extend in first direction perpendicular to the first and second side edges. The thermoplastic bag also includes a plurality of land areas positioned about the plurality of raised rib-like elements. The plurality of land areas extend in a direction parallel to the first and second side edges. When the thermoplastic bag is subjected to an applied force in the direction parallel to the first and second side edges the plurality of land areas resist deformation in the direction a parallel to the first and second side edges. Furthermore, portions of the first and second sidewalls comprising rib-like elements form billows when the thermoplastic bag is subjected to an applied force in the direction parallel to the first and second side edges.

One or more additional implementations of the present disclosure includes a method for making a thermoplastic film exhibiting low force extension. The method involves passing a thermoplastic film between a first intermeshing roller and a second intermeshing roller. At least one of the first intermeshing roller and the second intermeshing roller comprises a repeat unit of a plurality of ridges, a plurality of notches, and a plurality of grooves. The repeat unit causes creation of a complex stretch pattern in the thermoplastic film. The complex stretch pattern comprising a plurality of raised rib-like elements and a plurality of land areas positioned that extend in a first direction. The plurality of raised rib-like elements and the plurality of land areas are sized and positioned such that, when subjected to the applied force in the first direction, the thermoplastic film provides a low force extension.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load, a stretch profile of the thermoplastic film has a complex shape. For example, in one or more implementations, the thermoplastic film has: a stretch profile that includes multiple inflection points, a stretch profile having a derivative with a positive slope in an initial elongation zone, and/or a stretch profile having a derivative with that does not consist of a bell shape. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load and during an initial elongation zone from zero percent to five percent, the thermoplastic film undergoes both geometric and molecular deformation. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied load, the thermoplastic film undergoes multiple phases in which a major portion of a deformation of the thermoplastic film is geometric deformation. Additional implementations include bags having sidewalls formed from such a film and methods of making such films and bags.

One or more implementations of the present disclosure includes a thermoplastic film including a plurality of raised rib-like elements extending in a direction perpendicular to a main surface of the thermoplastic film. The thermoplastic film further includes a plurality of web areas positioned about the plurality of raised rib-like elements. The plurality of raised rib-like elements and the plurality of web areas are sized and positioned such that, when subjected to an applied and subsequently released load, billows are formed in the thermoplastic film with one or more of heights greater than 3000 micrometers or widths greater than 3000 micrometers. Additional implementations include bags having sidewalls formed from such a film and methods of making such films and bags.

Additional features and advantages of will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above recited and other advantages and features of the present disclosure can be obtained, a more particular description of the present disclosure briefly described above will be rendered by reference to specific implementations thereof which are illustrated in the appended drawings. It should be noted that the figures are not drawn to scale, and that elements of similar structure or function are generally represented by like reference numerals for illustrative purposes throughout the figures. Understanding that these drawings depict only typical implementations of the present disclosure and are not therefore to be considered to be limiting of its scope, the present disclosure will be described and explained with additional specificity and detail through the use of the accompanying drawings in which:

FIG. 5A shows a partial perspective view of a film having a complex stretch pattern in the form of a checkerboard pattern according to one or more implementations of the present disclosure;

FIG. 6A illustrates a profile, taken from a micro-photograph, of a film with a complex stretch pattern after having been subjected to an applied, and subsequently released, strain according to one or more implementations of the present disclosure;

FIG. 6B illustrates a profile, taken from a micro-photograph, of another film with a complex stretch pattern after having been subjected to an applied, and subsequently released, strain according to one or more implementations of the present disclosure;

FIG. 6C illustrates a profile, taken from a micro-photograph, of a prior-art SELF'ed film after having been subjected to an applied, and subsequently released, strain according to one or more implementations of the present disclosure;

FIG. 8A shows a front view of a film with a complex stretch pattern in the form of micro and macro diamond patterns with land areas parallel to the direction of applied force according to one or more implementations of the present disclosure;

FIG. 8B shows a front view of the film of FIG. 9A after having been subjected to an applied, and subsequently released, strain according to one or more implementations of the present disclosure;

FIG. 8C shows a front view of a film with land areas that provide low force extension according to one or more implementations of the present disclosure;

FIG. 8D shows a front view of the film of FIG. 8C after having been subjected to an applied, and subsequently released, strain according to one or more implementations of the present disclosure;

FIG. 9A shows a graph representing a stretch profile of a conventional SELF'd film;

FIG. 9B shows a graph representing a derivative of the stretch profile of FIG. 10A;

FIG. 10A shows a graph representing stretch profiles of two films with complex stretch patterns according to one or more implementations of the present disclosure;

FIG. 10B shows a graph representing derivatives of the stretch profiles of FIG. 11A;

DETAILED DESCRIPTION

Figure 1C:
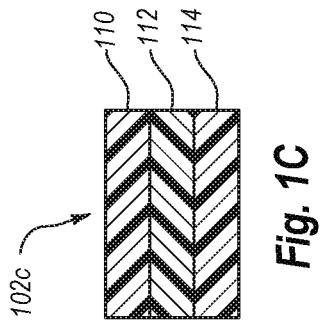
FIGS. 1A-1C show partial side cross-sectional views of films having varying numbers of sublayers according to one or more implementations of the present disclosure.

One or more implementations of the present disclosure include thermoplastic films with complex structural elastic-like film (SELF) patterns. As described below, the complex stretch or SELF patterns provide the thermoplastic films, and products made therefrom, with various advantages. For example, the complex SELF patterns can provide tactile and visual cues of strength/quality as the films are elongated, subjected to a load, or otherwise stretched.

One or more implementations include thermoplastic films with strainable networks created by SELF'ing process. The strainable network can comprise a plurality of raised rib-like elements extending in a direction perpendicular to a main surface of the thermoplastic film. The raised rib-like elements are surrounded by a plurality of web areas. The raised rib-like elements and web areas can comprise a strainable network that provides the thermoplastic film with an elastic-like behavior. In particular, when subjected to an applied load, the raised rib-like elements can initially undergo a substantially geometric deformation before undergoing substantial molecular-level deformation when subjected to an applied load. On the other hand, the web areas can undergo a substantially molecular-level and geometric deformation in response to the applied strain. U.S. Pat. Nos. 5,518,801 and 5,650,214 each disclose processes for forming strainable networks using SELF'ing processes. The contents of each of the aforementioned patents are incorporated in their entirety by reference herein.

In addition to the elastic-like characteristics mentioned above and the other benefits described in the above incorporated patents, implementations of the present disclosure include sized and positioned strainable networks in complex patterns that provide previously unrealized film properties and characteristics. For example, one or more implementations include sizing and positioning the plurality of raised rib-like elements and the plurality of web areas such that, when subjected to an applied load, a stretch profile of the thermoplastic film has a complex shape. As used herein, a stretch profile refers to how a film elongates when subjected to an applied load. A stress-strain curve or a stress-elongation curve shows a thermoplastic film's stretch profile. Details on creating a stress-elongation curve are provided below. Non-limiting examples of complex stretch profiles or stretch profiles with a complex shape include stretch profiles with multiple inflection points, stretch profiles having a derivative with a positive slope in an initial elongation zone, and stretch profiles having a derivative with that does not consist of a bell shape. Each of the complex stretch profiles mentioned above can provide various benefits, such as tactile feedback to a user that indicates strength, resistance to elongation (e.g., low force extension), or multi-stage geometric elongation as explained in greater detail below.

Additionally, one or more implementations include sizing and positioning the plurality of raised rib-like elements and the plurality of web areas such that, when subjected to an applied load, the thermoplastic film undergoes both geometric and molecular deformation in an initial elongation zone. The combined geometric and molecular deformation can provide a resistance to stretching that builds at a faster rate than conventional films with strainable networks created by a SELF'ing process. This initial resistance to stretching can provide customers a sensory feedback and signal strength.

Furthermore, one or more implementations include sizing and positioning the plurality of raised rib-like elements and the plurality of web areas such that, when subjected to an applied load, the thermoplastic film experiences multiple distinct phases in which a major portion of the deformation is geometric deformation. For example, the plurality of the raised rib-like elements can be arranged in multiple patterns comprising differs shapes and differing sizes of raised rib-like elements. The multiple distinct phases in which a major portion of the deformation is geometric deformation can be due at least in part to the differing configurations of the patterns of the raised rib-like elements undergoing geometric deformation at differing points during elongation of the thermoplastic film. The distinct phases in which a major portion of the deformation is geometric deformation can comprise phases in which less force is needed to elongate the thermoplastic film than a force in an immediate adjacent phase of elongation. The distinct phases in which a major portion of the deformation is geometric deformation provides the film with a lessened resistance to stretching in differing phases. This varying resistance to stretching can provide customers a sensory feedback and signal strength. As used herein "major" refers to a non-negligible amount that meaningfully contributes to an affect. For example, "major" can comprise an amount (percentage) from about 20% to 100%. In one or more embodiments, major is 30%, 40%, 50% or more than 50%. As used herein "dominate" refers to an amount that provides the majority of an affect. Thus, dominate comprise percentages greater than 50%.

Additionally, one or more implementations include sizing and positioning the plurality of raised rib-like elements and the plurality of web areas such that, when subjected to an applied and subsequently released load, billows form in the thermoplastic film. In some implementations, the billows may give the film a thicker and stronger appearance in comparison to conventional films while utilizing a same amount of material. Furthermore, billows can provide an increased perception of stretch performance in comparison to conventional films. In one or more embodiments, the billows have one or more of heights greater than 3000 micrometers or widths greater than 3000 micrometers.

One or more implementations of the present disclosure include products made from or with such thermoplastic films with complex SELF patterns. For example, such products include, but are not limited to, grocery bags, trash bags, sacks, and packaging materials, feminine hygiene products, baby diapers, adult incontinence products, or other products. For ease in description, the figures and bulk of the following disclosure focuses on films and bags. One will appreciate that teachings and disclosure equally applies to other products.

Film Materials

As an initial matter, the thermoplastic material of the films of one or more implementations of the present disclosure may include thermoplastic polyolefins, including polyethylene and copolymers thereof and polypropylene and copolymers thereof The olefin-based polymers may include ethylene or propylene-based polymers such as polyethylene, polypropylene, and copolymers such as ethylene vinyl acetate (EVA), ethylene methyl acrylate (EMA) and ethylene acrylic acid (EAA), or blends of such polyolefins.

Other examples of polymers suitable for use as films in accordance with the present disclosure may include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), oriented poly(ethylene-terephthalate), poly (ethylene-butylacrylate), polyurethane, poly(ethylene-propylene-diene), ethylene-propylene rubber, nylon, etc.

Some of the examples and description herein below refer to films formed from linear low-density polyethylene. The term "linear low-density polyethylene" (LLDPE) as used herein is defined to mean a copolymer of ethylene and a minor amount of an olefin containing 4 to 10 carbon atoms, having a density of from about 0.910 to about 0.930, and a melt index (MI) of from about 0.5 to about 10. For example, some examples herein use an octene comonomer, solution phase LLDPE (MI=1.1; $\rho$=0.920). Additionally, other examples use a gas phase LLDPE, which is a hexene gas phase LLDPE formulated with slip/AB (MI=1.0; $\rho$=0.920). Still further examples use a gas phase LLDPE, which is a hexene gas phase LLDPE formulated with slip/AB (MI=1.0; $\rho$=0.926). One will appreciate that the present disclosure is not limited to LLDPE, and can include "high density polyethylene" (HDPE), "low density polyethylene" (LDPE), and "very low-density polyethylene" (VLDPE). Indeed, films made from any of the previously mentioned thermoplastic materials or combinations thereof can be suitable for use with the present disclosure.

Some implementations of the present disclosure may include any flexible or pliable thermoplastic material that may be formed or drawn into a web or film. Furthermore, the thermoplastic materials may include a single layer or multiple layers. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic materials. As used herein, the term "elastic-like" describes the behavior of web materials which when subjected to an applied strain, the web materials extend in the direction of applied strain, and when the applied strain is released the web materials return, to a degree, to their pre-strained condition.

As used herein, the term "substantially," in reference to a given parameter, property, or condition, means to a degree that one of ordinary skill in the art would understand that the given parameter, property, or condition is met within a degree of variance, such as within acceptable manufacturing tolerances. By way of example, depending on the particular parameter, property, or condition that is substantially met, the parameter, property, or condition may be at least 70.0% met, at least 80.0%, at least 90% met, at least 95.0% met, at least 99.0% met, or even at least 99.9% met.

Additional additives that may be included in one or more implementations include slip agents, anti-block agents, voiding agents, or tackifiers. Additionally, one or more implementations of the present disclosure include films that are devoid of voiding agents. Some examples of inorganic voiding agents, which may further provide odor control, include the following but are not limited to: calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, charcoal, zeolites, any combination thereof, etc. Organic voiding agents, polymers that are immiscible in the major polymer matrix, can also be used. For instance, polystyrene can be used as a voiding agent in polyethylene and polypropylene films.

One of ordinary skill in the art will appreciate in view of the present disclosure that manufacturers may form the films or webs to be used with the present disclosure using a wide variety of techniques. For example, a manufacturer can form precursor mix of the thermoplastic material and one or more additives. The manufacturer can then form the film(s) from the precursor mix using conventional flat or cast extrusion or co-extrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

An optional part of the film-making process is a procedure known as "orientation." The orientation of a polymer is a reference to its molecular organization, i.e., the orientation of molecules relative to each other. Similarly, the process of orientation is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process can require different procedures. This is related to the different physical characteristics possessed by films made by conventional filmmaking processes (e.g., casting and blowing). Generally, blown films tend to have greater stiffness and toughness. By contrast, cast films usually have the advantages of greater film clarity and uniformity of thickness and flatness, generally permitting use of a wider range of polymers and producing a higher quality film.

When a film has been stretched in a single direction (mono-axial orientation), the resulting film can exhibit strength and stiffness along the direction of stretch, but can be weak in the other direction, i.e., across the stretch, often splitting when flexed or pulled. To overcome this limitation, two-way or biaxial orientation can be employed to more evenly distribute the strength qualities of the film in two directions. Most biaxial orientation processes use apparatus that stretches the film sequentially, first in one direction and then in the other.

In one or more implementations, the films of the present disclosure are blown film, or cast film. Both a blown film and a cast film can be formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference in their entirety. Examples of various extruders, which can be used in producing the films to be used with the present disclosure, can be a single screw type modified with a blown film die, an air ring, and continuous take off equipment.

In one or more implementations, a manufacturer can use multiple extruders to supply different melt streams, which a feed block can order into different channels of a multichannel die. The multiple extruders can allow a manufacturer to form a film with layers having different compositions. Such multi-layer film may later be provided with a complex stretch pattern to provide the benefits of the present disclosure.

In a blown film process, the die can be an upright cylinder with a circular opening. Rollers can pull molten thermoplastic material upward away from the die. An air-ring can cool the film as the film travels upwards. An air outlet can force compressed air into the center of the extruded circular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

In any event, in one or more implementations, the extrusion process can orient the polymer chains of the blown film. The "orientation" of a polymer is a reference to its molecular organization, i.e., the orientation of molecules or polymer chains relative to each other. In particular, the extrusion process can cause the polymer chains of the blown film to be predominantly oriented in the machine direction. The orientation of the polymer chains can result in an increased strength in the direction of the orientation. As used herein predominately oriented in a particular direction means that the polymer chains are more oriented in the particular direction than another direction. One will appreciate, however, that a film that is predominately oriented in a particular direction can still include polymer chains oriented in directions other than the particular direction. Thus, in one or more implementations the initial or starting films (films before being stretched or bonded or laminated in accordance with the principles described herein) can comprise a blown film that is predominately oriented in the machine direction.

The process of blowing up the tubular stock or bubble can further orient the polymer chains of the blown film. In particular, the blow-up process can cause the polymer chains of the blown film to be bi-axially oriented. Despite being bi-axially oriented, in one or more implementations the polymer chains of the blown film are predominantly oriented in the machine direction (i.e., oriented more in the machine direction than the transverse direction).

The films of one or more implementations of the present disclosure can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present disclosure may not be uniform. Thus, the starting gauge of films of one or more implementations of the present disclosure may vary along the length and/or width of the film.

One or more layers of the films described herein can comprise any flexible or pliable material comprising a thermoplastic material and that can be formed or drawn into a web or film. As described above, the film includes a plurality of layers of thermoplastic films. Each individual film layer may itself include a single layer or multiple layers. In other words, the individual layers of the multi-layer film may each themselves comprise a plurality of laminated layers. Such layers may be significantly more tightly bonded together than the bonding provided by the purposely weak discontinuous bonding in the finished multi-layer film. Both tight and relatively weak lamination can be accomplished by joining layers by mechanical pressure, joining layers with adhesives, joining with heat and pressure, spread coating, extrusion coating, ultrasonic bonding, static bonding, cohesive bonding and combinations thereof. Adjacent sub-layers of an individual layer may be coextruded. Co-extrusion results in tight bonding so that the bond strength is greater than the tear resistance of the resulting laminate (i.e., rather than allowing adjacent layers to be peeled apart through breakage of the lamination bonds, the film will tear).

Figure 1B:
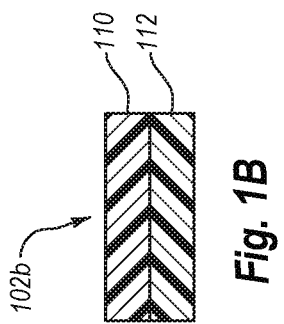
Figure 1A:
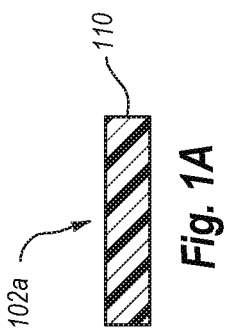

Films having a complex stretch pattern can may include a single film formed from one, two, three, or more layers of thermoplastic material. FIGS. 1A-1C are partial cross-sectional views of multi-layer films into which a complex stretch pattern can be formed. Such films can then be used to form products, such as a thermoplastic bag. In some implementations, the film may include a single layer film 102a, as shown in FIG. 1A, comprising a single layer 110. In other embodiments, the film can comprise a two-layer film 102b as shown in FIG. 1B, including a first layer 110 and a second layer 112. The first and second layers 110, 112 can be coextruded. In such implementations, the first and second layers 110, 112 may optionally include different grades of thermoplastic material and/or include different additives, including polymer additives. In yet other implementations, a film be a tri-layer film 102c, as shown in FIG. 1C, including a first layer 110, a second layer 112, and a third layer 114. In yet other implementations, a film may include more than three layers. The tri-layer film 102c can include an A:B:C configuration in which all three layers vary in one or more of gauge, composition, color, transparency, or other properties. Alternatively, the tri-layer film 102c can comprise an A:A:B structure or A:B:A structure in which two layers have the same composition, color, transparency, or other properties. In an A:A:B structure or A:B:A structure the A layers can comprise the same gauge or differing gauge. For example, in an A:A:B structure or A:B:A structure the film layers can comprise layer ratios of 20:20:60, 40:40:20, 15:70:15, 33:34:33, 20:60:20, 40:20:40, or other ratios.

Typically, the stretchable portion of a complex stretch pattern comprises an area that is SELF'ed or stretched by opposing rollers in a process known as transverse direction ring rolling (TDRR). The rollers comprise a collection of machine direction (MD) oriented embossing elements (e.g., rib-like elements or any other pattern). Two opposing rollers form a compression nip to emboss the film such that the film is thinned between the ribs. Thus, the film is susceptible to greater deformation via expansion in the transverse direction (TD) direction during TD tensile stress owing to these pre-thinned areas of film that occur in bands parallel with the MD. Generally, these pre-thinned areas impart the visible perception of stretch.

Figure 2:
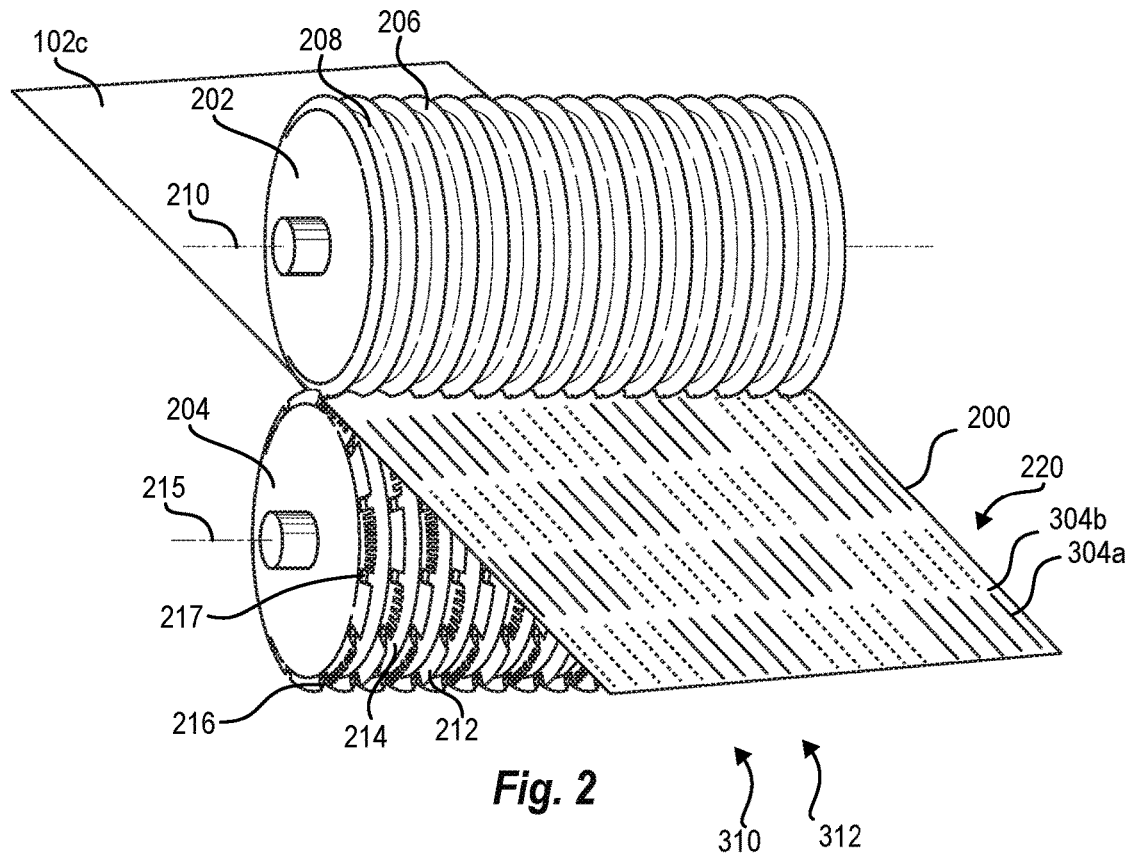
FIG. 2 shows a perspective view of a pair of SELF'ing rollers utilized to form complex stretch patterns in films according to one or more implementations of the present disclosure.

For example, FIG. 2 shows a pair of SELF'ing intermeshing rollers 202, 204 (e.g., a first SELF'ing intermeshing roller 202 and a second SELF'ing intermeshing roller 204) for creating strainable networks with complex patterns. As shown in FIG. 2, the first SELF'ing intermeshing roller 202 may include a plurality of ridges 206 and grooves 208 extending generally radially outward in a direction orthogonal to an axis of rotation 210. As a result, the first SELF'ing intermeshing roller 202 can be similar to a transverse direction ("TD") intermeshing roller such as the TD intermeshing rollers described in U.S. Pat. No. 9,186,862 to Broering et al., the disclosure of which is incorporated in its entirety by reference herein. The second SELF'ing intermeshing roller 204 can also include a plurality of ridges 212 and grooves 214 extending generally radially outward in a direction orthogonal to an axis of rotation 215. As shown in FIG. 2, in some embodiments, the ridges 216 of the second SELF'ing intermeshing roller 204 may include a plurality of notches 217 that define a plurality of spaced teeth 216.

As shown by FIG. 2, passing a film, such as film 102c, through the SELF'ing intermeshing rollers 202, 204 can produce a thermoplastic film 200 with one or more strainable networks formed by a structural elastic like process in which the strainable networks have a complex pattern 220 in the form of a checkerboard pattern. As used herein, the term "strainable network" refers to an interconnected and inter-related group of regions which are able to be extended to some useful degree in a predetermined direction providing the web material with an elastic-like behavior in response to an applied and subsequently released elongation.

Figure 3:
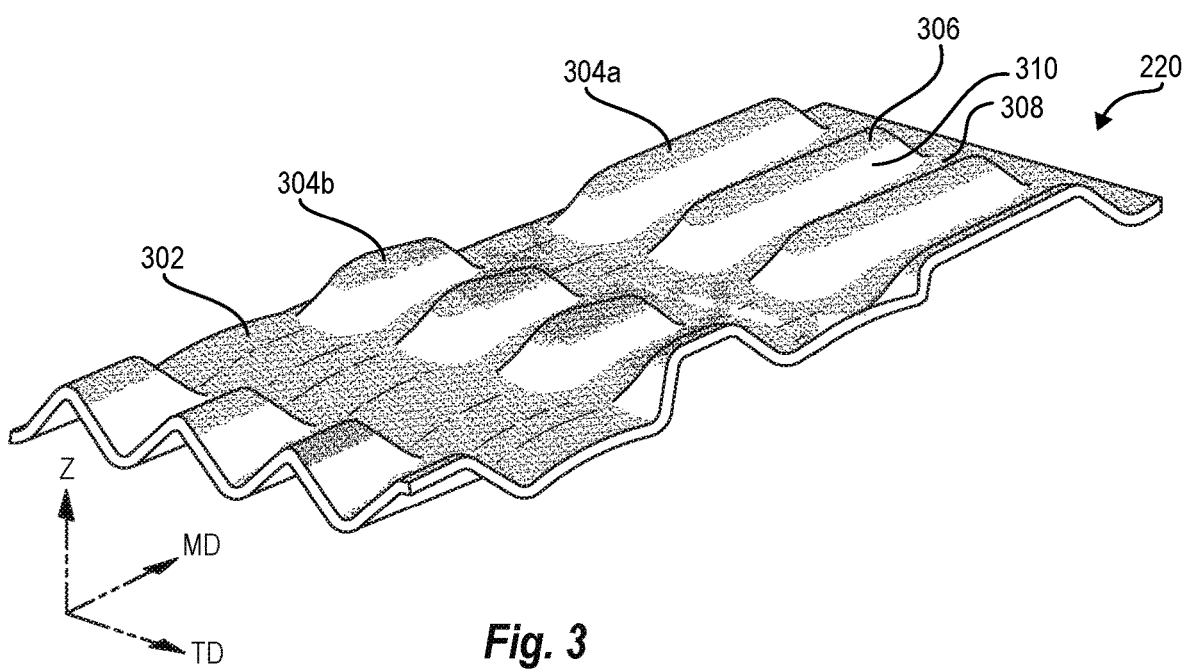
FIG. 3 shows a perspective view of a SELF'ed film having a complex stretch pattern according to one or more implementations of the present disclosure.

FIG. 3 shows a portion of the thermoplastic film 200 with the complex stretch pattern 220. Referring to FIGS. 2 and 3 together, as the film passes through the SELF'ing intermeshing rollers 202, 204, the teeth 216 can press a portion of the film out of plane defined by the film to cause permanent deformation of a portion of the film in the Z-direction. For example, the teeth 216 can intermittently stretch a portion of the film 102c in the Z-direction. The portions of the film 102c that pass between the notched regions 217 of the teeth 216 will remain substantially unformed in the Z-direction. As a result of the foregoing, the thermoplastic film 200 with the complex stretch pattern 220 includes a plurality of isolated deformed, raised, rib-like elements 304 and at least one un-deformed portion (e.g., sometimes referred to as a web area or land area) 302 (e.g., a relatively flat region). As will be understood by one of ordinary skill in the art, the length and width of the rib-like elements 304 depend on the length and width of teeth 216 and the speed and the depth of engagement of the intermeshing rollers 202, 204. The rib-like elements 304 and the un-deformed web areas 302 form a strainable network.

As shown in FIG. 3, the strainable network of the film 200 can include first thicker regions 306, second thicker regions 308, and stretched, thinner transitional regions 310 connecting the first and second thicker regions 306, 308. The first thicker regions 306 and the stretched, thinner regions 310 can form the raised rib-like elements 304 of the strainable network. In one or more embodiments, the first thicker regions 306 are the portions of the film with the greatest displacement in the Z-direction. In one or more embodiments, because the film is displaced in the Z-direction by pushing the rib-like elements 304 in a direction perpendicular to a main surface of the thermoplastic film (thereby stretching the regions 310 upward) a total length and width of the film does not substantially change when the film is subjected to the SELF'ing process of one or more embodiments of the present invention. In other words, the film 102c (film prior to undergoing the SELF'ing process) can have substantially the same width and length as the film 200 resulting from the SELF'ing process.

As shown by FIG. 3, the rib-like elements can have a major axis and a minor axis (i.e., the rib-like elements are elongated such that they are longer than they are wide). As shown by FIGS. 2 and 3, in one or more embodiments, the major axes of the rib-like elements are parallel to the machine direction (i.e., the direction in which the film was extruded). In alternative embodiments, the major axes of the rib-like elements are parallel to the transverse direction. In still further embodiments, the major axes of the rib-like elements are oriented at an angle between 1 and 89 degrees relative to the machine direction. For example, in one or more embodiments, the major axes of the rib-like elements are at a 45-degree angle to the machine direction. In one or more embodiments, the major axes are linear (i.e., in a straight line) in alternative embodiments the major axes are curved or have otherwise non-linear shapes.

The rib-like elements 304 can undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation or tearing of the film, one is not able to discern the deformation, which allows or causes it to happen. This is in contrast to the term "geometric deformation," which refers to deformations that are generally discernible to the normal naked eye when a SELF'ed film or articles embodying the such a film are subjected to an applied load or force. Types of geometric deformation include, but are not limited to bending, unfolding, and rotating.

Thus, upon application of a force, the rib-like elements 304 can undergo geometric deformation before undergoing molecular-level deformation. For example, a strain applied to the film 200 in a perpendicular to the major axes of the rib-like elements 304 can pull the rib-like elements 304 back into plane with the web areas 302 prior to any molecular-level deformation of the rib-like elements 304. Geometric deformation can result in significantly less resistive forces to an applied strain than that exhibited by molecular-level deformation.

As mentioned above, the rib-like elements 304 and the web areas 220 can be sized and positioned so as to create a complex stretch pattern. The complex stretch pattern can provide one or more of the benefits discussed herein. For example, the complex stretch pattern can cause a film (when subjected to an applied load) to have or exhibit one or more of: a stretch profile with a complex shape, both geometric and molecular deformation in an initial elongation zone (i.e., from zero percent to five percent elongation), multiple phases in which a major portion of a deformation of the thermoplastic film is geometric deformation, a stretch profile that includes multiple inflection points, a derivative of a stretch profile with a positive slope in an initial elongation zone, or billows with one or more of heights greater than 3000 micrometers or widths greater than 3000 micrometers.

As shown by FIGS. 2 and 3, groups of rib-like elements 304 can be arranged in different arrangements to form a complex stretching pattern. For example, a first plurality of raised rib-like elements 304a can be arranged in a first pattern 310 and a second plurality of raised rib-like elements 304b arranged in a second pattern 312. The first and the second patterns 310, 312 of raised rib-like elements 304a, 304b can repeat across the thermoplastic film 200. As shown by FIG. 2, first and the second patterns 310, 312 of raised rib-like elements 304a, 304b can form a checkerboard pattern 220.

In one or more implementations, the first pattern 310 is visually distinct from the second pattern 312. As used herein, the term "visually distinct" refers to features of the web material which are readily discernible to the normal naked eye when the web material or objects embodying the web material are subjected to normal use.

In one or more embodiments, the first pattern 310 of raised rib-like elements 304a comprises a macro pattern while the second pattern 312 of raised rib-like elements 304b comprises a macro pattern. As used herein a macro pattern is a pattern that is larger in one or more ways than a micro pattern. For example, as shown by FIG. 2, the macro pattern 310 has larger/longer raised rib-like elements 304a than the raised rib-like elements 304b of the micro pattern 312. In alternative embodiments, the surface area of a given macro pattern 310 covers more surface area than a surface area covered by a given micro pattern 312. In still further embodiments, a macro pattern 310 can include larger/wider web portions between adjacent raised rib-like elements than web portions between adjacent raised rib-like elements of a micro pattern 312.

As mentioned above, the raised rib-like elements 304a are longer than the raised rib-like elements 304b. In one or more embodiments, the raised rib-like elements 304a have a length at least 1.5 times the length of the raised rib-like elements 304b. For example, the raised rib-like elements 304a can have a length between 1.5 and 20 times the length of the raised rib-like elements 304b. In particular, the raised rib-like elements 304a can have a length 2, 3, 4, 5, 6, 8, or 10 times the length of the raised rib-like elements 304b.

Figure 4:
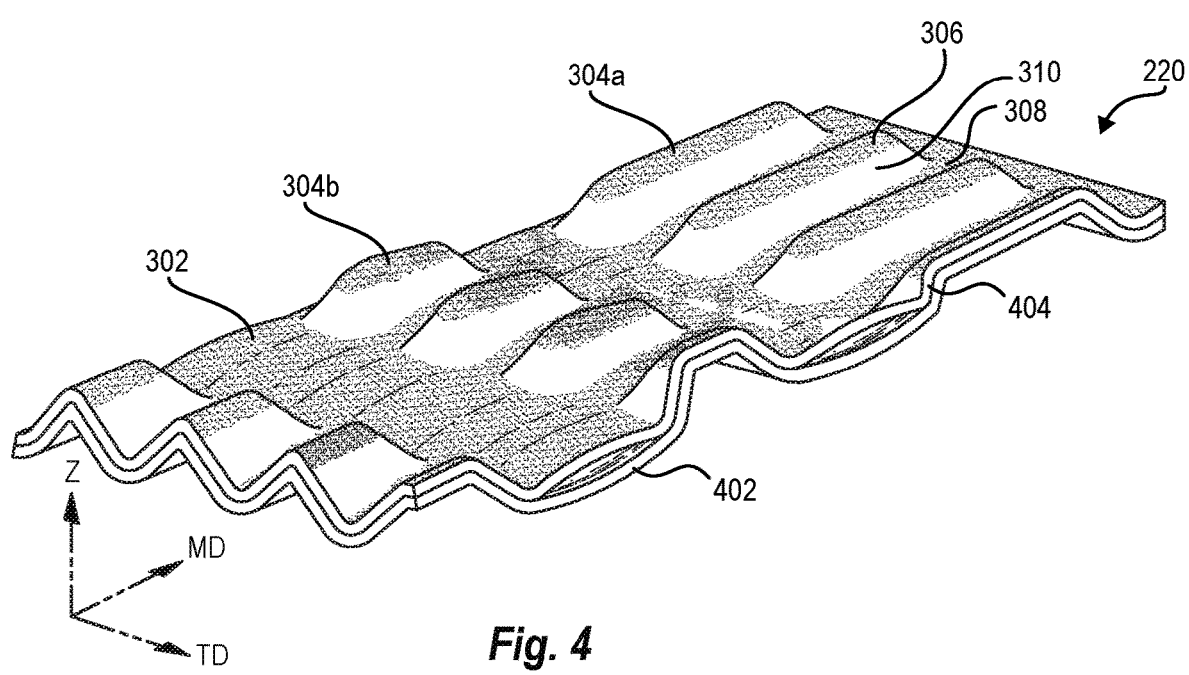
FIG. 4 shows a perspective view of a multi-layer SELF'ed film having a complex stretch pattern according to one or more implementations of the present disclosure.

In one or more implementations, the films with a complex stretch pattern may comprise two or more distinct thermoplastic films (i.e., two films extruded separately). The distinct thermoplastic films can be non-continuously bonded to one another. For example, in one or more embodiments two film layers can be passed together through a pair of SELF'ing rollers to produce a multi-layered lightly-bonded laminate film 200a with the complex stretch pattern 220, as shown in FIG. 4. The multi-layered lightly-bonded laminate film 200a can comprise a first thermoplastic film 402 partially discontinuously bonded to a second thermoplastic film 404. In one or more embodiments, the bonds between the first thermoplastic film 402 and the second thermoplastic film 404 are aligned with the first thicker regions 306 and are formed by the pressure of the SELF'ing rollers displacing the raised rib-like elements 304a, 304b. Thus, the bonds can be parallel to the raised rib-like elements 304a, 304b and be positioned between raised rib-like elements 304a, 304b of the first thermoplastic film 402 and the second thermoplastic film 404.

As used herein, the terms "lamination," "laminate," and "laminated film," refer to the process and resulting product made by bonding together two or more layers of film or other material. The term "bonding", when used in reference to bonding of multiple layers of a multi-layer film, may be used interchangeably with "lamination" of the layers. According to methods of the present disclosure, adjacent layers of a multi-layer film are laminated or bonded to one another. The bonding purposely results in a relatively weak bond between the layers that has a bond strength that is less than the strength of the weakest layer of the film. This allows the lamination bonds to fail before the film layer, and thus the bond, fails.

The term laminate is also inclusive of co-extruded multilayer films comprising one or more tie layers. As a verb, "laminate" means to affix or adhere (by means of, for example, adhesive bonding, pressure bonding, ultrasonic bonding, corona lamination, static bonds, cohesive bonds, and the like) two or more separately made film articles to one another so as to form a multi-layer structure. As a noun, "laminate" means a product produced by the affixing or adhering just described.

As used herein the terms "partially discontinuous bonding" or "partially discontinuous lamination" refers to lamination of two or more layers where the lamination is substantially continuous in the machine direction or in the transverse direction, but not continuous in the other of the machine direction or the transverse direction. Alternately, partially discontinuous lamination refers to lamination of two or more layers where the lamination is substantially continuous in the width of the article but not continuous in the height of the article, or substantially continuous in the height of the article but not continuous in the width of the article. More particularly, partially discontinuous lamination refers to lamination of two or more layers with repeating bonded patterns broken up by repeating unbounded areas in either the machine direction or the transverse direction.

In one or more embodiments, the first and second films 402, 404 may be discontinuously bonded together via one or more of the methods of bonding films together as described in U.S. Pat. No. 8,603,609, the disclosure of which is incorporated in its entirety by reference herein. In particular, the first and second films 402, 404 may be bonded via one or more of MD rolling, TD rolling, DD ring rolling, SELF'ing, pressure bonding, corona lamination, adhesives, or combinations thereof. In some implementations, the first and second films 402, 404 may be bonded such that the bonded regions have bond strengths below a strength of the weakest film of the first and second films 402, 404. In other words, the bonded regions may fail (e.g., break apart) before the first or second films 402, 404 fail. As a result, discontinuously bonding the first and second films 402, 404 may can also increase or otherwise modify one or more of the tensile strength, tear resistance, impact resistance, or elasticity of the films. Furthermore, the bonded regions between the first and second films 402, 404 may provide additional strength. Such bonded regions may be broken to absorb forces rather than such forces resulting in tearing of the film.

Furthermore, any of the pressure techniques (i.e., bonding techniques) described in U.S. Pat. No. 8,603,609 may be combined with other techniques in order to further increase the strength of the bonded regions while maintaining bond strength below the strength of the weakest layer of the multi-layer laminate film. For example, heat, pressure, ultrasonic bonding, corona treatment, or coating (e.g., printing) with adhesives may be employed. Treatment with a corona discharge can enhance any of the above methods by increasing the tackiness of the film surface so as to provide a stronger lamination bond, but which is still weaker than the tear resistance of the individual layers.

Discontinuously bonding the first and second films 402, 404 together results in un-bonded regions and bonded regions between the first and second films 402, 404. For example, discontinuously bonding the first and second films 402, 404 together may result in un-bonded regions and bonded regions as described in the U.S. Pat. No. 9,637,278, the disclosure of which is incorporated in its entirety by reference herein.

Figure 5B:
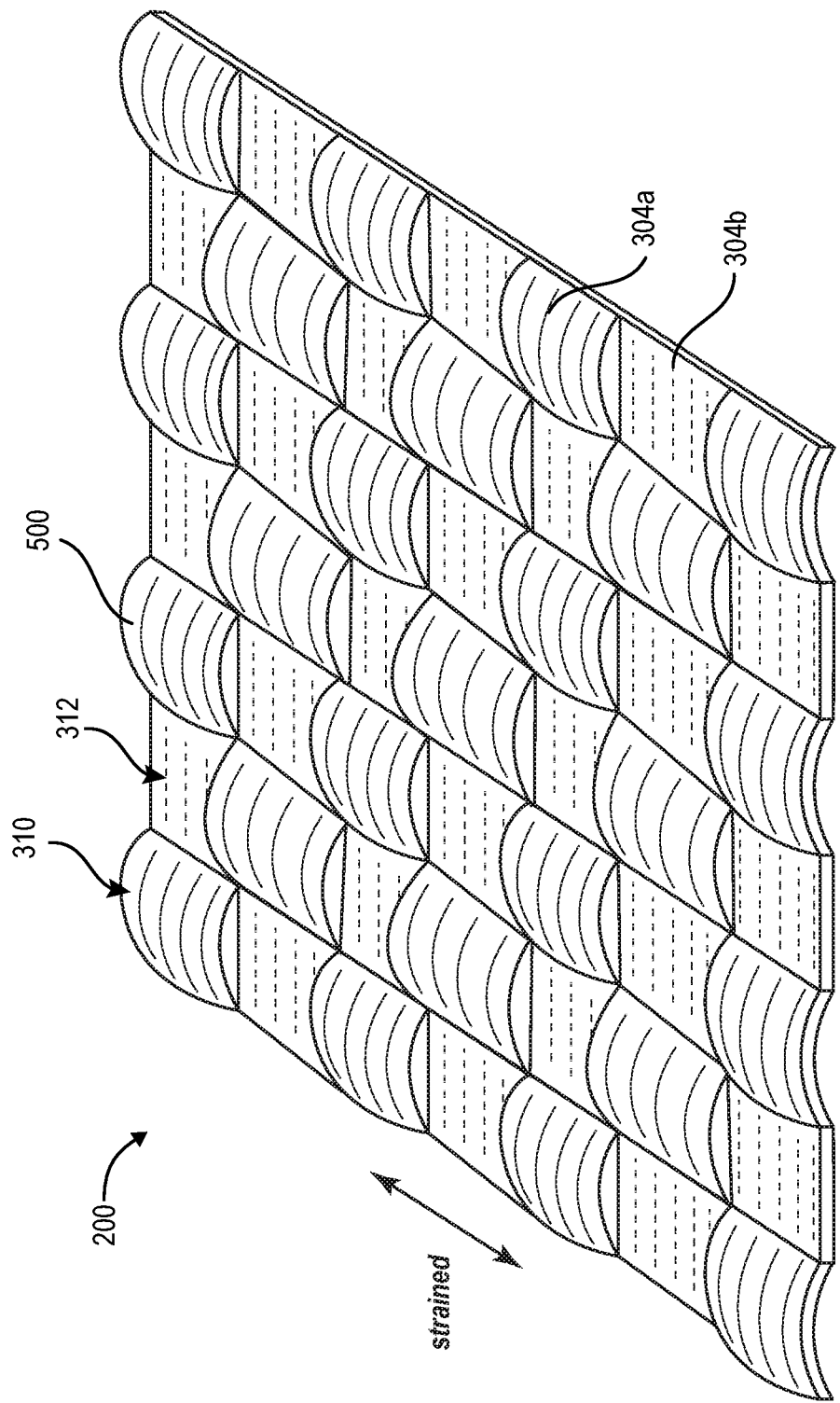
FIG. 5B shows a partial perspective view of the film of FIG. 5A after having been subjected to an applied, and subsequently released, load according to one or more implementations of the present disclosure.
Figure 5C:
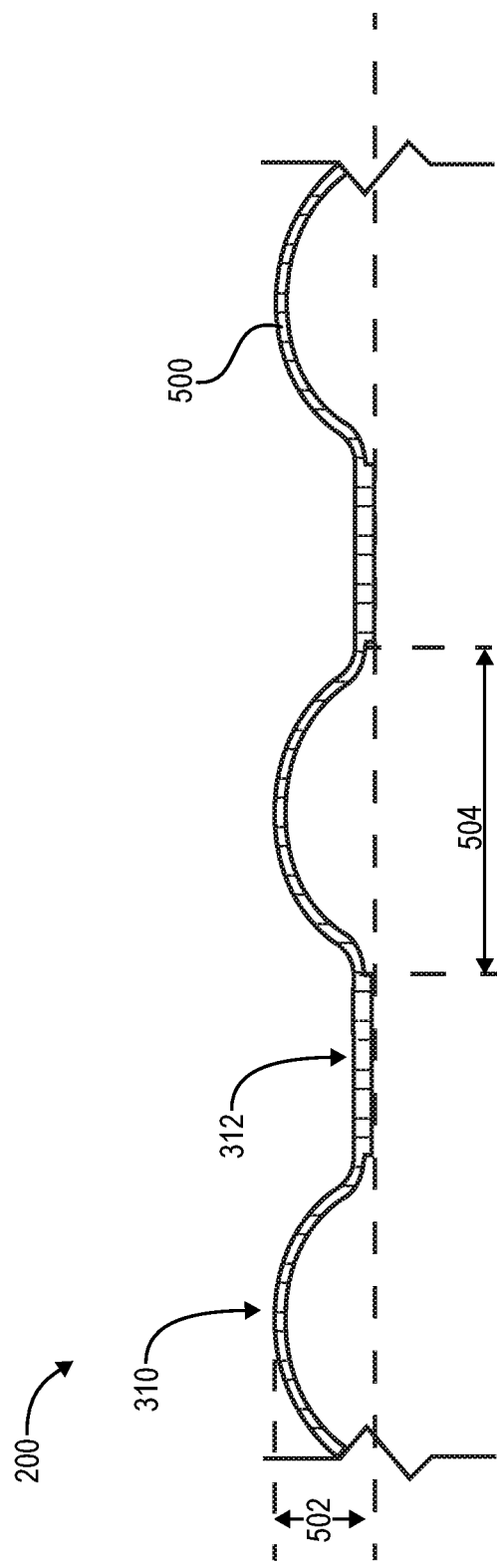
FIG. 5C shows a partial side cross-sectional view of the film of FIG. 5B.

Additional details of the benefits of a complex stretch pattern will be described in relation to FIGS. 5A-5C. FIG. 5A is a perspective view of a portion of the thermoplastic film 200 with the complex stretch pattern 220 in an unstrained configuration (i.e., prior to being subjected to an applied load). FIG. 5B is a perspective view of a portion of the thermoplastic film 200 with the complex stretch pattern 220 after having been strained (i.e., after having been subjected to an applied and subsequently released load). FIG. 5C on the other hand illustrates a cross sectional view of a portion of the thermoplastic film 200 with the complex stretch pattern 220 after having been strained.

As shown, after the load is released the thermoplastic film 200 returns, to a substantial degree, to its condition prior to being subjected to the load. As shown by a comparison of FIGS. 5A-5C, in some implementations, when subjected to an applied and subsequently released load, billows 500 are formed in the thermoplastic film 200. The billows 500 may at least partially extend outward from the plane of the thermoplastic film 200 and may form a protruding shape. For example, the billows 500 may have a general square dome shape (i.e., a dome having a square base). One will appreciate that the configuration of the billows 500 can be based on a given complex stretch pattern.

As used herein the term "billow" refers to the puckering of a thermoplastic film such that the thermoplastic film does not lie in a planar position. As shown by FIG. 5C, the billows 500 can comprise a height 502 and a width 504. The height 502 is measured at the farthest point in the Z-direction from a base of the billow 500. In one or more embodiments, the billows 500 have one or more of average heights 502 greater than 3000 micrometers or average widths 504 greater than 3000 micrometers. More particularly, the billows 500 can be between 4000 and 16000 micrometers in width and between 3000 and 5000 micrometers in height.

In some implementations, the height 502 is within a range of about 2800 μm to about 3600 μm. In additional implementations, the height 502 is within a range of about 3000 μm to about 3400 μm. In yet further implementations, the height 502 is about 3200 μm. In some instances, the width 504 may be within the range of about 8000 μm to about 14500 μm. In additional implementations, the width 504 may be within the range of about 8400 μm to about 14000 μm.

As noted above, the billows can increase a height of the film or, in other words, provide the film with loft. For example, an activated film with complex stretch pattern (SELF'ed and then strained film) can have height that is 100 to 350 times the original gauge of the film (i.e., gauge prior to passing through the SELF'ing rollers). In one or more embodiments, an activated film with complex stretch pattern can have a height that is 125 to 350 times the original gauge of the film, a height that is 150 to 250 times the original gauge of the film, a height that is 175 to 250 times the original gauge of the film, a height that is 200 to 250 times the original gauge of the film, or a height that is 225 to 250 times the original gauge of the film.

The original rib-like elements of one or more embodiments of a film with a complex stretch pattern can comprise a height of about 1.50 millimeters to about 3.00 millimeters. Thus, upon activation a loft or height of a film with a complex stretch pattern can have a height that is 1.2 to 15.0 times the original gauge of the film, a height that is 1.5 to 12.0 times the original gauge of the film, a height that is 2.6 to 10.6 times the original gauge of the film, a height that is 5.3 to 10.6 times the original gauge of the film, or a height that is 5 to 7.5 times the original gauge of the film.

Furthermore, implementations of the present invention allow for tailoring (e.g., increasing) of the loft of a film independent of the basis weight (amount of raw material) of the film. Thus, one or more implementations can provide films with increased loft despite a reduction in thermoplastic material. As such, one or more implementations can reduce the material needed to produce a product while maintaining or increasing the loft of the film.

As shown in FIG. 5B, the billows 500 are in areas of the thermoplastic film comprising the first pattern 310 (e.g., macro pattern) of raised rib-like elements while areas comprising the second pattern 312 (e.g., micro pattern) of raised rib-like elements lack billows with heights greater than 3000 micrometers. Thus, the areas of the thermoplastic film comprising the first pattern 310 of raised rib-like elements can have a first resistance to stretching. The areas of the thermoplastic film comprising the second pattern 312 of raised rib-like elements can have a second resistance to stretching that is greater than the first resistance to stretching as explained in greater detail below.

Additionally, the billows 500 (e.g., areas of the thermoplastic film comprising the first pattern 310 of raised rib-like elements) have a first visual characteristic. The unbillowed areas (e.g., areas of the thermoplastic film comprising the second pattern 312 of raised rib-like elements) have a second visual characteristic that differs from the first visual characteristic. For example, the billows 500 can have a different color, sheen, haze, transparency, refractivity, etc. The differing visual characters can cause the billows to pop or otherwise visually stand out.

While FIG. 5C illustrates a conceptual view of the billows 500, FIGS. 6A and 6B illustrate actual cross-sections of billows 500a, 500b of thermoplastic films with complex stretch patterns. FIG. 6C on the other hand shows a cross-section of a conventionally SELF'ed film with conventional billows 600. In particular, FIG. 6C shows a cross-section of a conventionally SELF'ed film with rib-like elements in a diamond patterns as described in U.S. Pat. No. 5,650,214. As shown, thermoplastic films with complex stretch patterns can have billows 500a, 500b that have heights 502a, 502b that are between 1.2 and 3.5 times the height 602 of billows 600 of conventionally SELF'ed films. Similarly, as shown, thermoplastic films with complex stretch patterns can have billows 500a, 500b that have widths that are between 2 and 6 times the width of billows 600 of conventionally SELF'ed films.

Figures 7A, 7B:
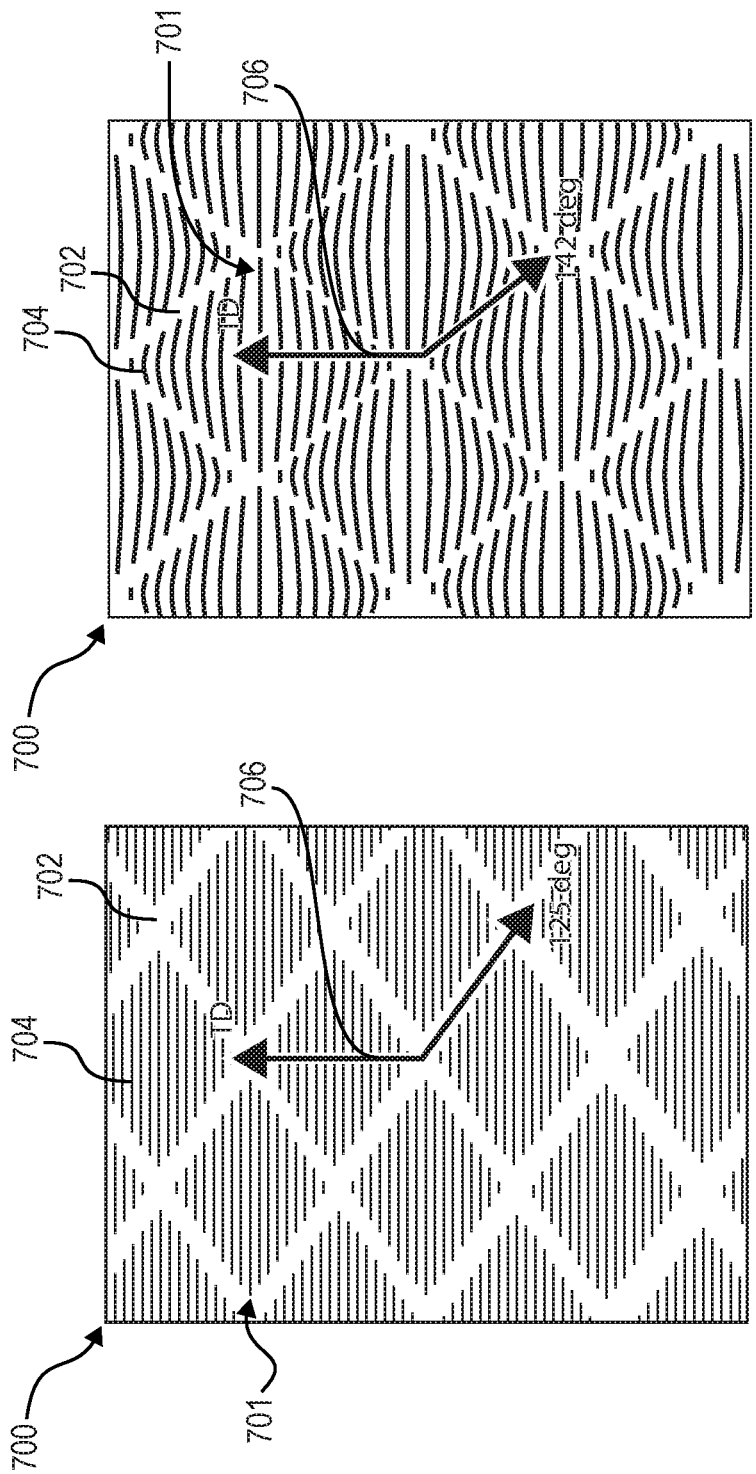
FIG. 7A shows a front view of a prior art film having a stretch pattern in a "Diamond" shape with land areas oriented non-parallel to the direction of applied force according to one or more implementations of the present disclosure.
FIG. 7B shows a front view of the film of FIG. 7A after having been subjected to an applied, and subsequently released, strain according to one or more implementations of the present disclosure.

FIGS. 7A and 7B illustrate a prior art pattern that offers greater force extension than the complex stretch patterns of the present disclosure. For example, the thermoplastic film 700 in FIG. 7A includes a conventional stretch pattern 701 (e.g., a diamond pattern). As shown in FIG. 7A, the stretch pattern 701 includes a plurality of isolated deformed, raised, rib-like elements 704 (e.g., forming "diamonds") separated by a land area 702. In at least one embodiment, the stretch pattern 701 features an approximately 78.4% proportion by area of ribs per repeat unit.

The stretch pattern 701 has a higher force extension equal to 0.16 inches or more per repeat unit when subjected to a tensile stress between 300 and 350 psi. For example, as shown in FIG. 7A, prior to the application of stress in the transverse direction, the land area 702 is oriented approximately 125 degrees from the transverse direction 708. After application of stress in the transverse direction, as shown in FIG. 7B, this angle increases to approximately 142 degrees. In other words, as stress is applied to the thermoplastic film 700 with the stretch pattern 701, the land areas 702 rotate along their length to approach the direction of the applied stress resulting in a higher measured linear deformation. In at least one embodiment, this rotation is even greater with a higher degree of applied stress.

In one or more embodiments, the degree of rotation by high force extension stretch patterns, such as the stretch pattern 701 is due, at least in part, to the orientation of the land areas 702. For example, the greater stretch of the stretch pattern 701 is because the stretch pattern 701 utilizes a land area 702 that fails to include any portions that are parallel with the direction of the applied stress (e.g., in the TD direction). As will be discussed in greater detail below, such parallel portions resist deformation and provide a low force extension to a thermoplastic film.

FIG. 8A is a top view of a portion of a thermoplastic film 200a with the complex stretch pattern 220a prior to being subjected to an applied load. FIG. 8B is a view of the portion of the thermoplastic film 200a with the complex stretch pattern 220a after having been strained (i.e., after having been subjected to an applied and subsequently released load). As shown, the raised rib-like elements 304a of the strained thermoplastic film 200a can be strained to a greater extent than the raised rib-like elements 304b. This can be due to the micro pattern 312a providing a greater resistance to stretching than the macro pattern 310a and/or the particular arrangement of the web or land areas between the raised rib-like elements 304b. Furthermore, the larger strain of the raised rib-like elements 304a of the macro pattern 310a can result in the billows described above.

Additionally, as shown in FIGS. 8A and 8B, the complex stretch pattern 220a includes land areas 302b between the rib-like elements 304b. In one or more embodiments, these land areas 302b enable the complex stretch pattern 220a to provide a perception of low force extension that is visibly equivalent to existing patterns (e.g., FIGS. 7A and 7B), while exhibiting a measured low force extension that is considerably less than existing patterns. In at least one embodiment, this is because of the nature of the visual deformation that occurs during application of stress. Accordingly, a film with the complex stretch pattern 220a including the land areas 302b feels stronger because it yields less at a given application of tensile stress.

A factor that influences measured extension and visible deformation is the shape of the complex stretch pattern 220a respective to the direction of tensile stress (e.g., the transverse direction or TD). Typically, in the case of a drawstring trash bag, the film is SELF'ed such that the direction of tensile stress applied by a user during lifting is in the film's transverse direction. Therefore, a complex stretch pattern that has limited TD extension yet provides the perception of stretch will have portions of the pattern that deform through expansion in the TD direction while other portions resist linear deformation. Thus, in order to create other portions that resist linear deformation, the pattern will also include portions that are void of machine direction (MD) rib elements so that no thinning occurs in those areas during SELF'ing (e.g., land areas).

In order to produce a perception of force extension that is visibly equivalent to existing patterns, it is particularly important with respect to creating portions of low deformation is the shape and orientation of land areas between complex stretch patterns. In one or more embodiments, when the length of land areas on a film are oriented parallel to the direction of an applied tensile stress (e.g., in the TD direction), the land areas will resist deformation. In at least one embodiment, this resistance is because the film is not thinned in the land areas, and as such these land areas offer greater yield strength relative to the thinned areas (e.g., the raised rib-like elements 304a). Conversely, when a film includes land areas that are oriented such that they are not parallel to the direction of an applied stress (e.g., as with the land areas 702 shown in FIGS. 7A and 7B), the land area can rotate along its length so that it is pulled parallel to the direction of the stress. This non-parallel land area is not yielding so much as it is rotating to effectively lengthen the amount of overall film deformation in the direction of the stress.

Thus, as shown in FIGS. 8A and 8B, in order to embody low force extensional properties, the film 200a features a complex stretch pattern 220a including 1) deformable areas that provide visible expansion upon stress (e.g., the first pattern 310a), and 2) land areas (e.g., the land areas 302b) that resist deformation by including a length dimension oriented in the direction of applied stress (e.g., the TD direction). For example, as shown in FIG. 8B, under applied stress in the TD direction, the land areas 302b remain oriented parallel to the TD direction. This is unlike non-parallel land areas 702, shown in FIG. 7B, which rotate in the direction of the applied stress.

In the embodiment shown in FIGS. 8A and 8B, the repeat unit that makes the complex stretch pattern 220a includes 76.5% MD rib-like elements. Of those rib-like elements, 50% are continuous rib-like elements (e.g., as in the first pattern 310a), which constitute the deformable area that provides visible expansion upon TD tensile stress. The remaining 26.5% of the MD rib-like elements are shorter non-continuous structures (e.g., as in the second pattern 312a). As further shown in FIGS. 8A and 8B, repeat unit that makes the complex stretch pattern 220a also includes 23.5% non-thinned land areas (e.g., the land areas 302b), all of which are oriented with lengths parallel to the TD axis. In at least one embodiment, these land areas 302b resist deformation.

In use, the complex stretch pattern 220a illustrated in FIGS. 8A and 8B exhibits low force extension under applied stress. For example, in one or more embodiments, the low force extension to the film 200a is extension between 0.04 and 0.12 inches per repeat unit when subjected to a tensile stress equal to between 300 and 350 pounds per square inch. In still further embodiments, the low force extension is equal to 0.08 inches per repeat unit when subjected to a tensile stress equal to 338 psi (0.25 lbs. per inch wide specimen at 0.74 mils thickness). As mentioned above, other conventional patterns including non-parallel land areas (e.g., such as the "Diamond" pattern illustrated in FIGS. 7A and 7B) exhibit greater measured force extension. For example, in at least one embodiment, the pattern shown in FIGS. 7A and 7B exhibits a force extension equal to 0.16 inches per repeat unit when subjected to a tensile stress equal to 338 psi (0.25 lbs. per inch wide specimen at 0.74 mils thickness). Thus, the stretch pattern in FIGS. 7A and 7B stretches twice as much extension as the complex stretch pattern 220b in FIGS. 8A and 8B, while offering no further semblance of visible deformation.

Furthermore, the greater degree of stretch exhibited by the stretch pattern 701 in FIGS. 7A and 7B is not solely attributable to its proportion of rib-like elements. As mentioned above, the stretch pattern 701 features approximately 78.4% rib-like elements per repeat unit. Similarly, the complex stretch pattern 220b in FIGS. 8A and 8B features approximately 76.4% rib-like elements per repeat unit. Thus, both the complex stretch pattern 220a and the complex stretch pattern 220b feature an essentially equivalent proportion of rib-like elements per repeat unit. Accordingly, as discussed above, the greater degree of stretch found in the complex stretch pattern 220a is largely attributable to the positioning and orientation of the land areas relative to the direction of an applied force.

In additional or alternative embodiment, a film exhibiting low force extension properties may include the same or different features as those described with reference to FIGS. 8A and 8B. For example, an alternative embodiment may include a film with no more than 76.5 percent of the main surface being made up of raised rib-like elements. Alternatively, a film may include more than 76.5 percent of the main surface being made up of raised rib-like elements. Additionally, while the land areas 302b of the complex stretch pattern 220a discussed with reference to FIGS. 8A and 8B are completely (e.g., 100%) oriented in the TD direction, other embodiments may include land areas that are only partially oriented in the TD direction (e.g., as will be discussed below with reference to FIGS. 12 and 13).

FIGS. 8C and 8D illustrate another embodiment of a film 200a exhibiting low force extension properties. For example, as shown in FIG. 8C, the film 200a includes a checker board pattern with blocks including the macro pattern 310a of raised rib-like elements 304a, and blocks of land areas 302e. Unlike the embodiment illustrated in FIGS. 8A and 8B, the land areas 302e illustrated in FIGS. 8C and 8D are discontinuous. Although similar to the land areas 302b in FIG. 8A, the land areas 302e are completely oriented in the TD direction. Thus, the land areas 302b of the film 200a in FIGS. 8A and 8B exhibits low force extension under applied stress.

As mentioned above, the complex stretch patterns described above can provide a thermoplastic film with a complex stretch profile (e.g., a stretch profile with a complex shape). In particular, one or more implementations include sizing and positioning the plurality of raised rib-like elements and the plurality of web areas such that, when subjected to an applied load, a stretch profile of the thermoplastic film has a complex shape. As used herein, a stretch profile refers to how a film elongates when subjected to an applied load. A stress-strain curve or a stress-elongation curve shows a thermoplastic film's stretch profile. Non-limiting examples of complex stretch profiles or stretch profiles with complex shapes include stretch profiles with multiple inflection points, stretch profiles having a derivative with a positive slope in an initial elongation zone, and stretch profiles having a derivative with that does not consist of a bell shape.

FIG. 9A illustrates a stretch profile 902 for conventional SELF'ed film (i.e., a film as disclosed by U.S. Pat. No. 5,650,214. As seen in FIG. 9A, the conventional SELF'ed film exhibits elongation behavior in three stages or zones 904, 906, and 908. The resistive force to elongation or stretch is significantly less in the first stage 904. This is because in this initial elongation zone the deformation/elongation of the conventional SELF'ed film is substantially, if not entirely, geometric. In particular, the deformation/elongation in the initial elongation zone is due to the raised rib-like elements geometrically deforming or unbending/unfolding so that they extend or length in the direction of the applied elongation. In particular, Because the deformation is geometric, the conventional SELF'ed film offers minimal resistance to elongation.

The second elongation zone 906 is a transition zone in which the rib-like elements are becoming aligned with the applied elongation. In the second elongation zone 906, the conventional SELF'ed film begins to change from geometric deformation to molecular level deformation. This is illustrated by the increase resistance to elongation illustrated by the increasing slope of the stretch profile 902. The third elongation zone begins at an inflection point 910 in the stretch profile 902. In the third elongation zone the film is undergoing substantially molecular level deformation. The inflection point 910 marks a change in the stretch profile 902 from being concave up to concave down.

Graph 900a of FIG. 9B is a derivative 902a of the stretch profile 902 of FIG. 9A. As shown, the derivative 902a of the stretch profile 902 includes a local maximum 912 that indicates the location of the inflection point 910 of the stretch profile 902. As shown by FIG. 9B, the derivative 902a of the stretch profile 902 has a bell shape. A bell shape is a generally concave down parabolic shape that can optionally include elongated beginning and/or ending tails. In other words, the derivative 902a of the stretch profile 902 indicates that the stretch profile 902 has a non-complex shape.

FIG. 10A illustrates a graph 1000 showing a stretch profile a stretch profile 1004 of the film 200 with the complex stretch pattern 220a (see e.g., FIGS. 8A and 8B). FIG. 10B includes a graph 1000a illustrating a derivative 1004a of the stretch profile 1004.

In one or more embodiments, the radius of the teeth of the SELF'ing rollers can be tailored to impact the slope of the stretch profile 1004. In particular, the sharpness of the corners of the teeth can impact transitions between raised-rib like elements, which in turn can impact when geometric and molecular deformation occurs.

As shown by the FIG. 10B the derivative 1004a show that the stretch profile 1004 has a complex shapes. In particular, the derivative 1004a does not consist of a bell shape. For example, derivative 1004a has multiple inflection extrema (local maxima and/or minima). The local extrema in the derivative 1004a indicate inflection points (two or more) in the stretch profiles 1004. More particularly, the derivative 1004a has three inflection points 1012a, 1012b, 1014—a first maximum 1012a, a second maximum 1012b, and a local minimum 1014 positioned between the first and second maxima.

In an initial elongation zone (from about 0% to about 8%) the thermoplastic film 200 undergoes both geometric and molecular deformation. This is shown by the derivative 1004a of the stretch profiles 1004 having a positive slope in the initial elongation zone. It will be noted that this in in contrast to the conventional SELF'ed film discussed above in relation to FIGS. 9A and 9B. Thus, the thermoplastic film 200 with a complex stretch pattern has an increase in stretch resistance in the initial elongation zone. The thermoplastic film 200 undergoes elongation in the initial elongation zone but also exhibits a resistance to elongation that builds at a faster rate than conventional SELF'ed films. This increased resistance provides a sensory feedback and a signal of strength.

In addition to the foregoing, the derivative 1004a indicates that the thermoplastic film 200 with the complex stretch pattern undergoes multiple phases in which a major portion of a deformation of the thermoplastic film is geometric deformation. This is in contrast to conventional SELF'ed films that undergo geometric deformation in a single phase or elongation zone.

For example, the thermoplastic film with the complex stretch pattern can undergo primarily geometric deformation in an initial elongation zone or phase from 0% elongation or strain to about 8% elongation or strain. The thermoplastic film with the complex stretch pattern can then undergo primarily geometric deformation in a subsequent elongation zone from about 23% percent elongation to about 31% elongation. In some implementations, the thermoplastic film with the complex stretch pattern may exhibit multiple phases of geometric deformation due to a combination of the macro patterns of raised rib-like elements and the micro patterns of raised rib-like elements. For example, the macro patterns of raised rib-like elements may geometrically deform first when the thermoplastic film is initially subjected to a strain. The micro patterns of raised rib-like elements may geometrically deform after the macro patterns of raised rib-like elements in a different elongation zone or phase.

Furthermore, in one or more implementations, due to the two distinct geometric deformations, the thermoplastic films with the complex stretch patterns of the present disclosure may provide a more tear resistant film in comparison to conventional films. For example, because any force applied to the thermoplastic films with the complex stretch patterns must overcome two separate distinct geometric deformations prior to causing substantial molecular deformation and eventual failure, the films of the present disclosure may provide increase tear resistance.

Figure 11A:
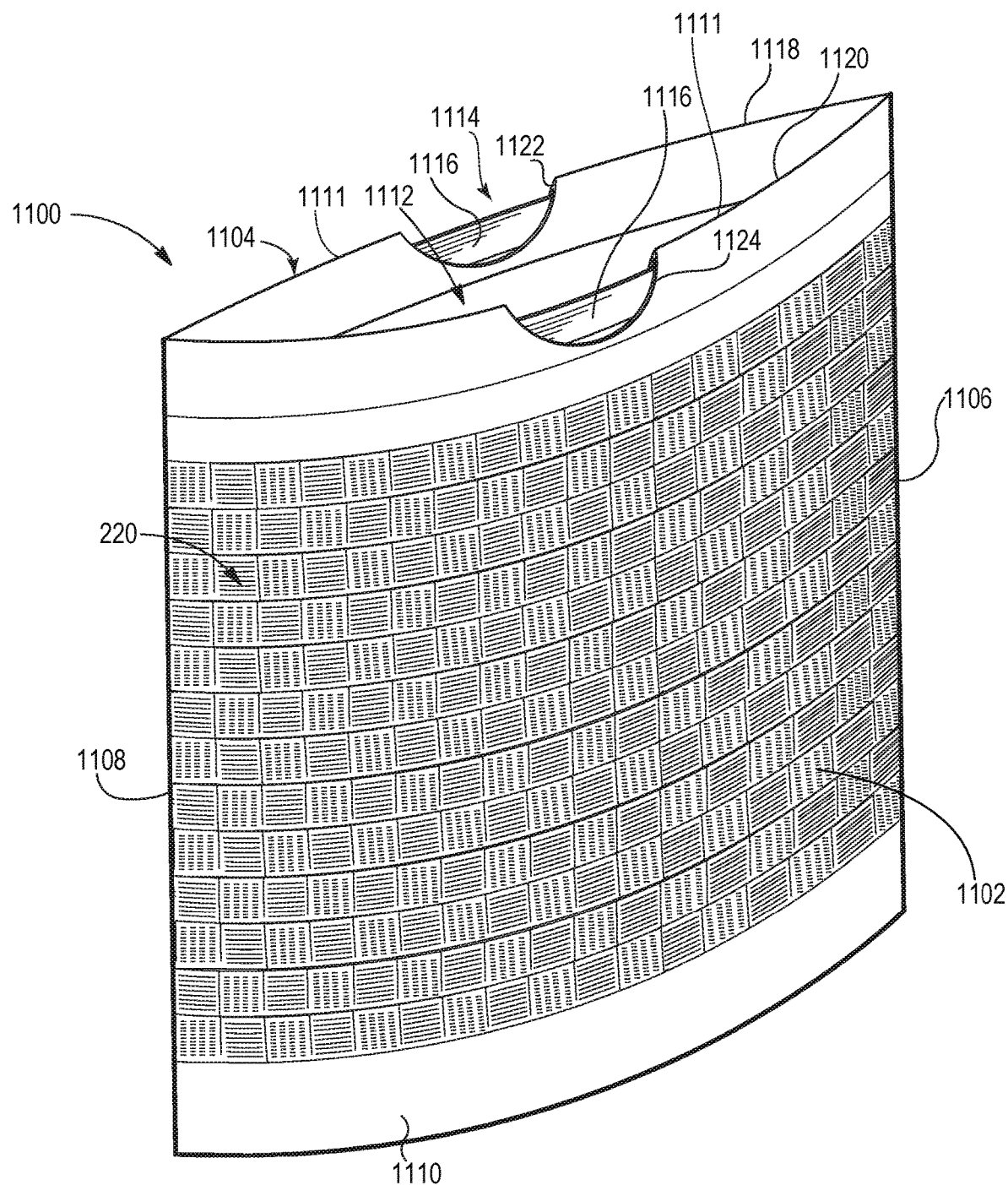
FIG. 11 shows a perspective view of a bag having a complex stretch pattern according to one or more implementations of the present disclosure.
Figure 11B:
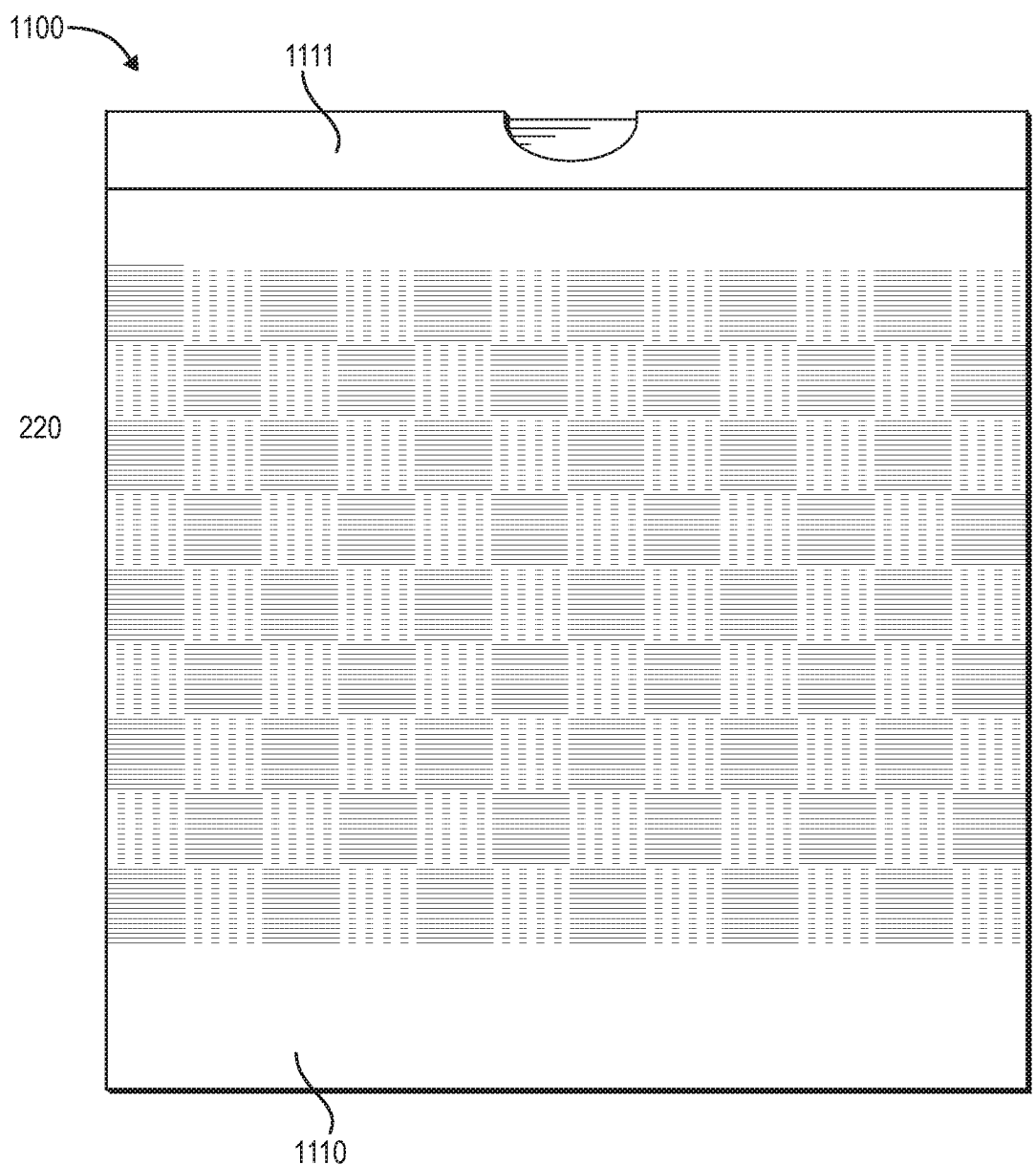
Figure 11C:
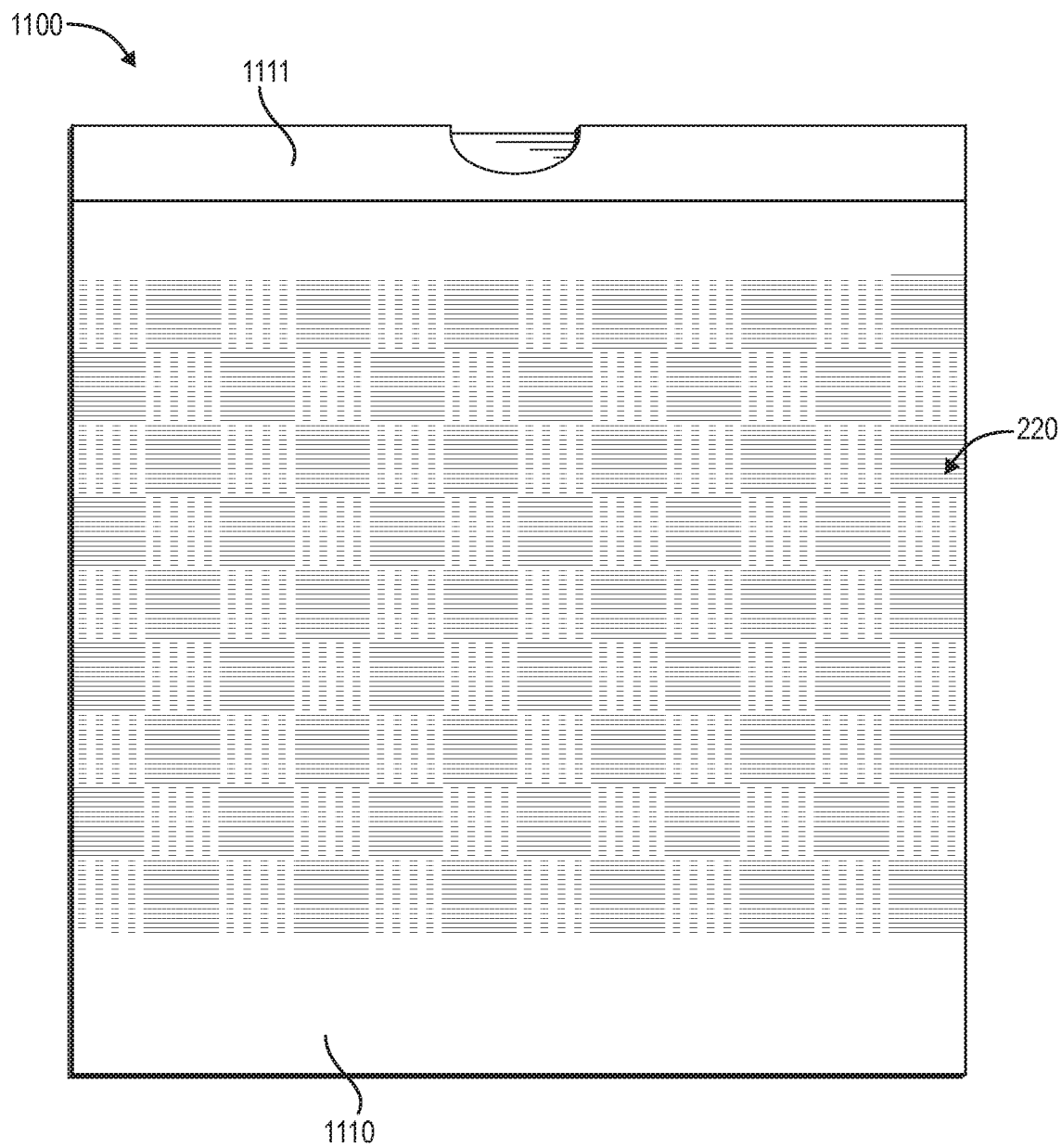

As mentioned above, one or more implementations of the present disclosure include products made from or with such thermoplastic films with complex stretch patterns. For example, such products include, but are not limited to, grocery bags, trash bags, sacks, and packaging materials, feminine hygiene products, baby diapers, adult incontinence products, or other products. The remaining figures describe various bags including complex stretch patterns and methods of making the same. For example, FIG. 11 is a perspective view of a thermoplastic bag 1100 with a complex stretch pattern 220 according to an implementation of the present disclosure. The thermoplastic bag 1100 with a complex stretch pattern includes a first sidewall 1102 and a second sidewall 1104. Each of the first and second sidewalls 1102, 1104 includes a first side edge 1106, a second opposite side edge 1108, a bottom edge 1110 extending between the first and second side edges 1106, 1108, and top edge 1111 extending between the first and second side edges 1106, 1108 opposite the bottom edge. In some implementations, the first sidewall 1102 and the second sidewall 1104 are joined together along the first side edges 1106, the second opposite side edges 1108, and the bottom edges 1110. The first and second sidewalls 1102, 1104 may be joined along the first and second side edges 1106, 1108 and bottom edges 1110 by any suitable process such as, for example, a heat seal. In alternative implementations, the first and second sidewalls 1102, 1104 may not be joined along the side edges. Rather, the first and second sidewalls 1102, 1104 may be a single uniform piece. In other words, the first and second sidewalls 1102, 1104 may form a sleeve or a balloon structure.

In some implementations, the bottom edge 1110 or one or more of the side edges 1106, 1108 can comprise a fold. In other words, the first and second sidewalls 1102, 1104 may comprise a single unitary piece of material. The top edges 1111 of the first and second sidewalls 1102, 1104 may define an opening 1112 to an interior of the thermoplastic bag 1100 with a complex stretch pattern. In other words, the opening 1112 may be oriented opposite the bottom edge 1110 of the thermoplastic bag 1100 with a complex stretch pattern. Furthermore, when placed in a trash receptacle, the top edges 1111 of the first and second sidewalls 1102, 1104 may be folded over the rim of the receptacle.

In some implementations, the thermoplastic bag 1100 with a complex stretch pattern may optionally include a closure mechanism 1114 located adjacent to the top edges 1111 for sealing the top of the thermoplastic bag 1100 with a complex stretch pattern to form an at least substantially fully-enclosed container or vessel. As shown in FIG. 11, in some implementations, the closure mechanism 1114 comprises a draw tape 1116, a first hem 1118, and a second hem 1120. In particular, the first top edge 1111 of the first sidewall 1102 may be folded back into the interior volume and may be attached to an interior surface of the first sidewall 1102 to form the first hem 1118. Similarly, the second top edge 1111 of the second sidewall 1104 is folded back into the interior volume and may be attached to an interior surface of the second sidewall 1104 to form a second hem 1120. The draw tape 1116 extends through the first and second hems 1118, 1120 along the first and second top edges 1111. The first hem 1118 includes a first aperture 1122 (e.g., notch) extending through the first hem 1118 and exposing a portion of the draw tape 1116. Similarly, the second hem 1120 includes a second aperture 1124 extending through the second hem 1120 and exposing another portion of the draw tape 1116. During use, pulling the draw tape 1116 through the first and second apertures 1122, 1124 will cause the first and second top edge 1110 to constrict. As a result, pulling the draw tape 1116 through the first and second apertures 1122, 1124 will cause the opening 1112 of the thermoplastic bag with a complex stretch pattern to at least partially close or reduce in size. The draw tape closure mechanism 1114 may be used with any of the implementations of a reinforced thermoplastic bag described herein.

Although the thermoplastic bag 1100 with a complex stretch pattern is described herein as including a draw tape closure mechanism 1114, one of ordinary skill in the art will readily recognize that other closure mechanisms 1114 may be implemented into the thermoplastic bag 1100 with a complex stretch pattern. For example, in some implementations, the closure mechanism 1114 may include one or more of flaps, adhesive tapes, a tuck and fold closure, an interlocking closure, a slider closure, a zipper closure, or any other closure structures known to those skilled in the art for closing a bag.

As shown in FIG. 11, the thermoplastic bag 1100 may include a complex stretch pattern 220 formed in one or more of the first sidewall 1102 and the second sidewall 1104. For example, as is discussed below, the complex stretch pattern may be formed in the first sidewall 1102 and/or the second sidewall 1104 via one or more of SELF'ing rollers or micro-SELF'ing rollers. The plurality of raised rib-like elements and the plurality of web areas of the complex stretch pattern 220 are sized and positioned such that: the thermoplastic bag 1100 has a stretch profile with a complex shape, the thermoplastic bag 1100 undergoes both geometric and molecular deformation in initial elongation zone when strained, the thermoplastic bag 1100 undergoes multiple phases in which a major portion of the deformation of the thermoplastic bag is geometric deformation, and/or when subjected to an applied and subsequently released load, billows are formed in the thermoplastic bag 1100 with one or more of heights greater than 3000 micrometers or widths greater than 3000 micrometers.

Figure 12:
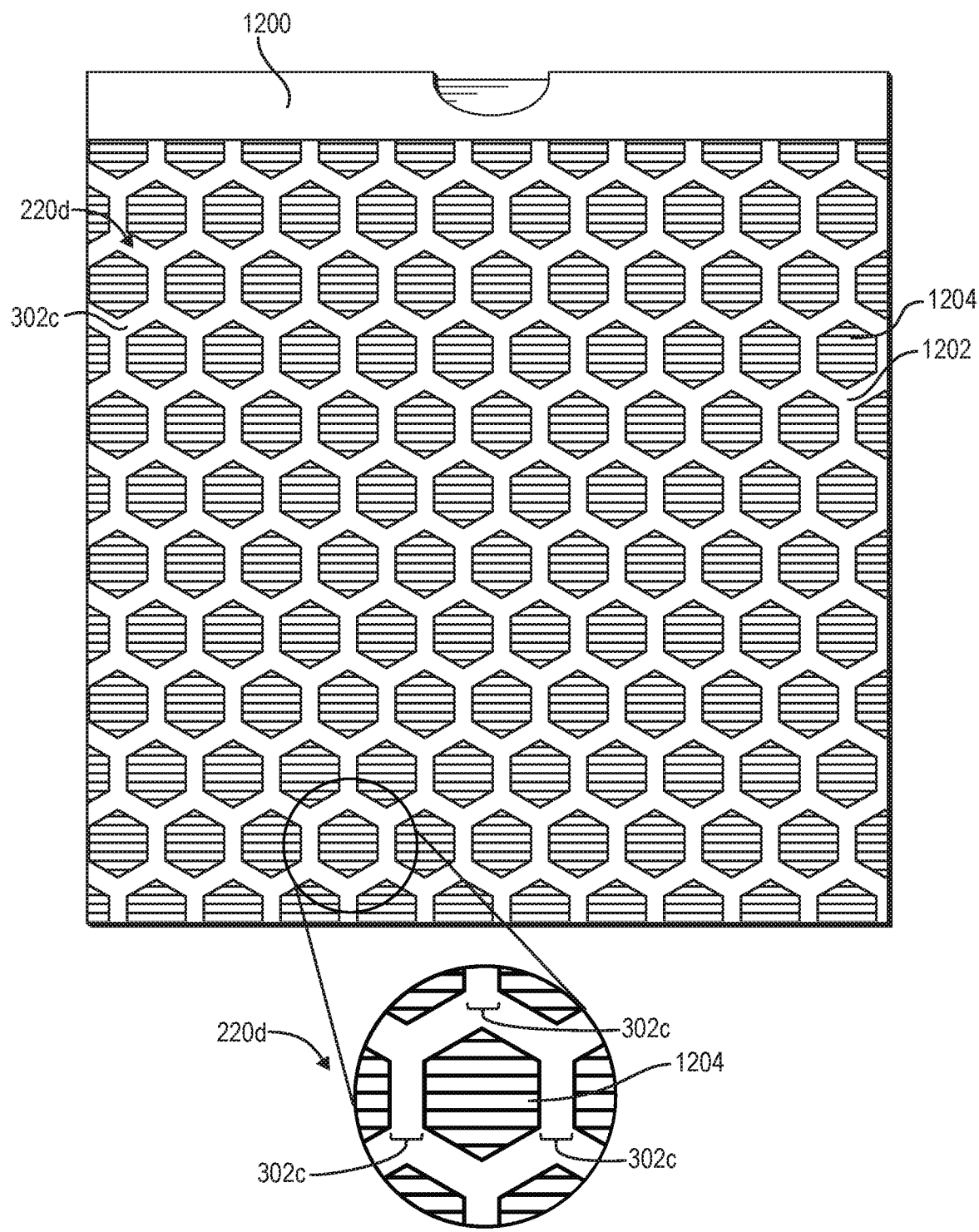
FIG. 12 is a front side view of a bag with a complex stretch pattern in the form of hexagons according to an implementation of the present disclosure.

FIG. 12 illustrates yet another thermoplastic bag 1200 with sidewalls including a complex stretch pattern 220*d* formed therein. The thermoplastic bag 1200 can include the same structure as the thermoplastic bag 1100 albeit with a different complex stretch pattern. In particular, the thermoplastic bag 1200 may include a plurality of raised rib-like elements 1204 in a hexagon pattern. As shown, the raised rib-like elements 1204 are surrounded by the land areas 302*c*. The plurality of raised rib-like elements and the plurality of land areas of the complex stretch pattern 220*d* are sized and positioned such that: the thermoplastic bag 1200 has a stretch profile with a complex shape, the thermoplastic bag 1200 undergoes both geometric and molecular deformation in initial elongation zone when strained, the thermoplastic bag 1200 undergoes multiple phases in which a major portion of the deformation of the thermoplastic bag is geometric deformation, and/or when subjected to an applied and subsequently released load, billows are formed in the thermoplastic bag 1200 with one or more of heights greater than 3000 micrometers or widths greater than 3000 micrometers.

As further shown in FIG. 12, the complex stretch pattern 220*d* includes land areas 302*c* with portions that are parallel to the direction of applied force (e.g., the TD direction), and portions that are non-parallel to the direction of applied force. For example, in the use case where a consumer pulls the thermoplastic bag 1200 up by the draw tape, the direction of applied force is in the same direction that the consumer is pulling (e.g., substantially vertical). Thus, the parallel portions of the land areas 302*c* are those that have lengths perpendicular to the top and bottom of the thermoplastic bag 1200. It follows that the non-parallel portions of the land areas 302*c* are those that have lengths that extend in non-perpendicular directions (e.g., with angles other than 180 degrees from vertical) from the top and bottom of the thermoplastic bag 1200.

In one or more embodiments, the thermoplastic bag 1200 (e.g., and the thermoplastic film making up the thermoplastic bag 1200) can exhibit low force extensional properties, even when only a portion of the land areas 302*c* is oriented parallel to the direction of applied force. As discussed above with reference to FIGS. 8A and 8B, a film exhibits the best low force extensional properties when one hundred percent of the included land areas are parallel to the direction of applied force (e.g., the TD direction). In alternative or additional embodiments, a film can still exhibit advantageous low force extensional properties when only a percentage of the land area is oriented parallel to the direction of applied force. For example, in some embodiments, a complex stretch pattern may exhibit low force extension properties when at least fifty percent of included land areas are parallel to the TD direction. Similarly, complex stretch patterns may exhibit low force extension properties when another percentage less than one hundred percent (e.g., at least eighty percent) of included land areas are parallel to the TD direction.

Figure 13:
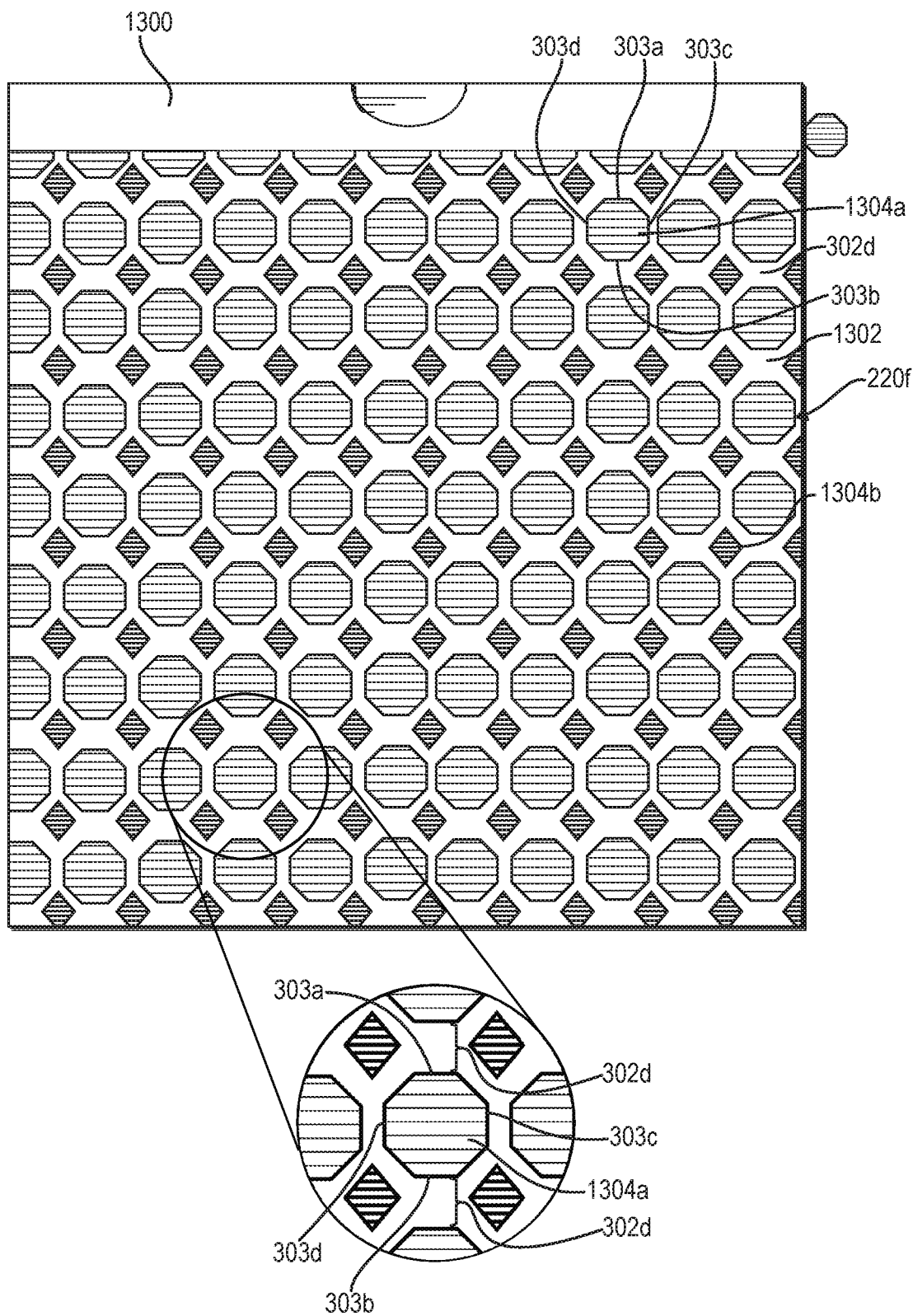
FIG. 13 is a front side view of a bag with a complex stretch pattern in the form of hexagons and diamonds according to an implementation of the present disclosure.

FIG. 13 illustrates a thermoplastic bag 1300 with sidewalls including a complex stretch pattern 220*f* formed therein. In particular, the complex stretch pattern 220*f* can comprise raised rib-like elements 1304*a* in octagon patterns, raised rib-like elements 1304*b* in diamond patterns, and land areas 302*d* positioned between and surrounding the octagon and diamond patterns. The plurality of raised rib-like elements and the plurality of web areas of the complex stretch pattern 220*f* are sized and positioned such that: the thermoplastic bag 1300 has a stretch profile with a complex shape, the thermoplastic bag 1300 undergoes both geometric and molecular deformation in initial elongation zone when strained, the thermoplastic bag 1300 undergoes multiple phases in which a major portion of the deformation of the thermoplastic bag is geometric deformation, and/or when subjected to an applied and subsequently released load, billows are formed in the thermoplastic bag 1300 with one or more of heights greater than 3000 micrometers or widths greater than 3000 micrometers.

As discussed above with reference to FIG. 12, the thermoplastic bag 1300 exhibits low force extensional properties even though less than one hundred percent of the land areas 302*d* are parallel with the direction of applied force. For example, as shown in FIG. 13, the land areas 302*d* at the top, bottom, and sides of each area of rib-like elements 1304*a* in octagon patterns are oriented parallel with the TD direction. The remainder of the land areas 302*d* are oriented non-parallel with the TD direction. In one or more embodiments, the complex stretch pattern 220*f* will exhibit advantageous low force extension properties as long as a threshold percentage or portion of the land areas 302*d* are oriented parallel with the direction of applied force (e.g., the TD direction).

Figure 14:
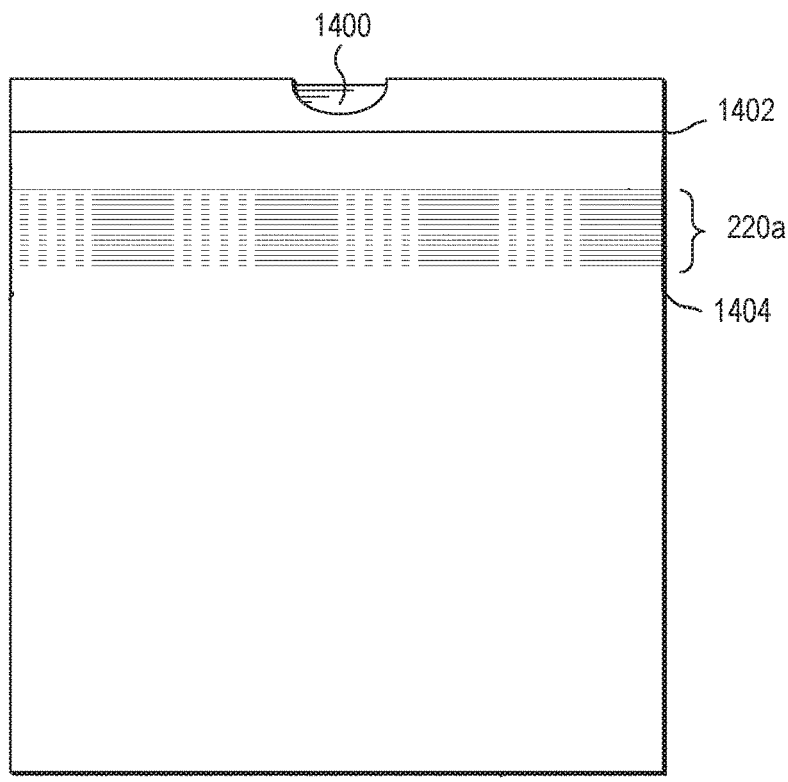
FIG. 14 is a front side view of a bag with a complex stretch pattern in a band cross the width of the bag but only a portion of the height of the bag according to an implementation of the present disclosure.

While the bags shown and described above include complex stretch patterns formed in the entire sidewalls of the bags, one will appreciate in light of the disclosure herein that the present invention is not so limited. In alternative embodiments, the bags can comprise complex stretch patterns in zones or areas so as to provide tailor stretch properties to different areas of the bag. For example, FIG. 14 illustrates a thermoplastic bag 1400 including a complex stretch pattern 220*a* formed in a band proximate a hem 1402 of the bag 1400. Thus, as shown a bottom portion 1404 of the bag 1400 (i.e., each sidewall) is devoid of raised rib-like elements.

Figure 15:
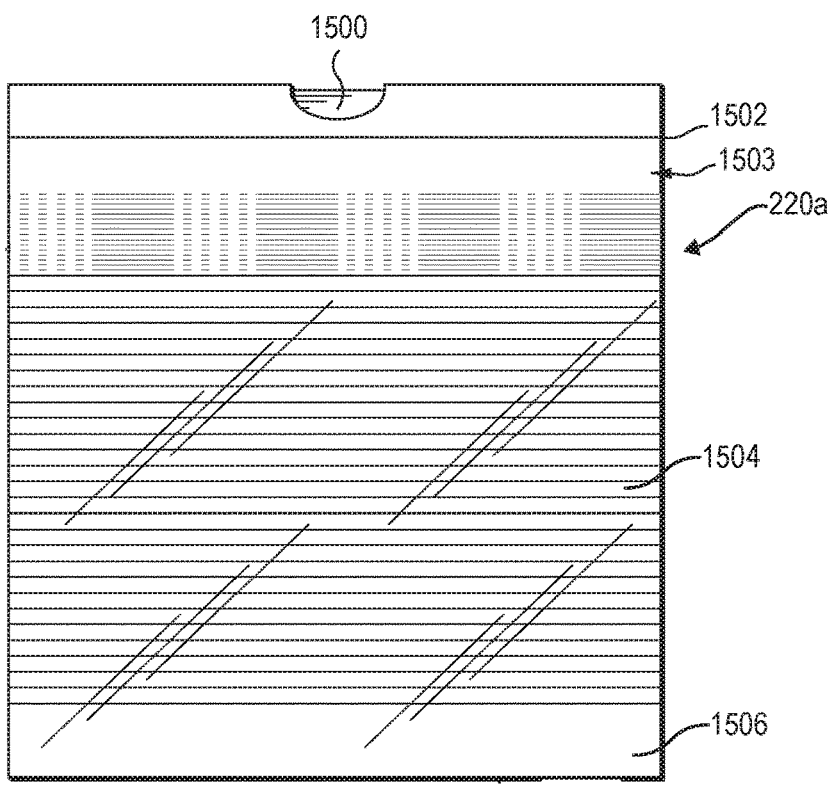
FIG. 15 is a front side view of another bag with a complex stretch pattern in a band cross the width of the bag but only a portion of the height of the bag according to an implementation of the present disclosure.

FIG. 15 illustrates another thermoplastic bag 1500 including a complex stretch pattern 220*a* formed in a band proximate a hem 1502 of the bag 1500. Rather than a middle portion 1504 of the bag 1500 (i.e., each sidewall) being devoid of raised rib-like elements, the middle portion 1504 includes incrementally stretched ribs formed by ring rolling as described in U.S. Pat. No. 9,637,278, the entire contents of which are hereby incorporated by reference. The thermoplastic bag 1500 also includes an un-stretched bottom region 1506 that is devoid of raised rib-like elements and incremental stretching.

Figure 16:
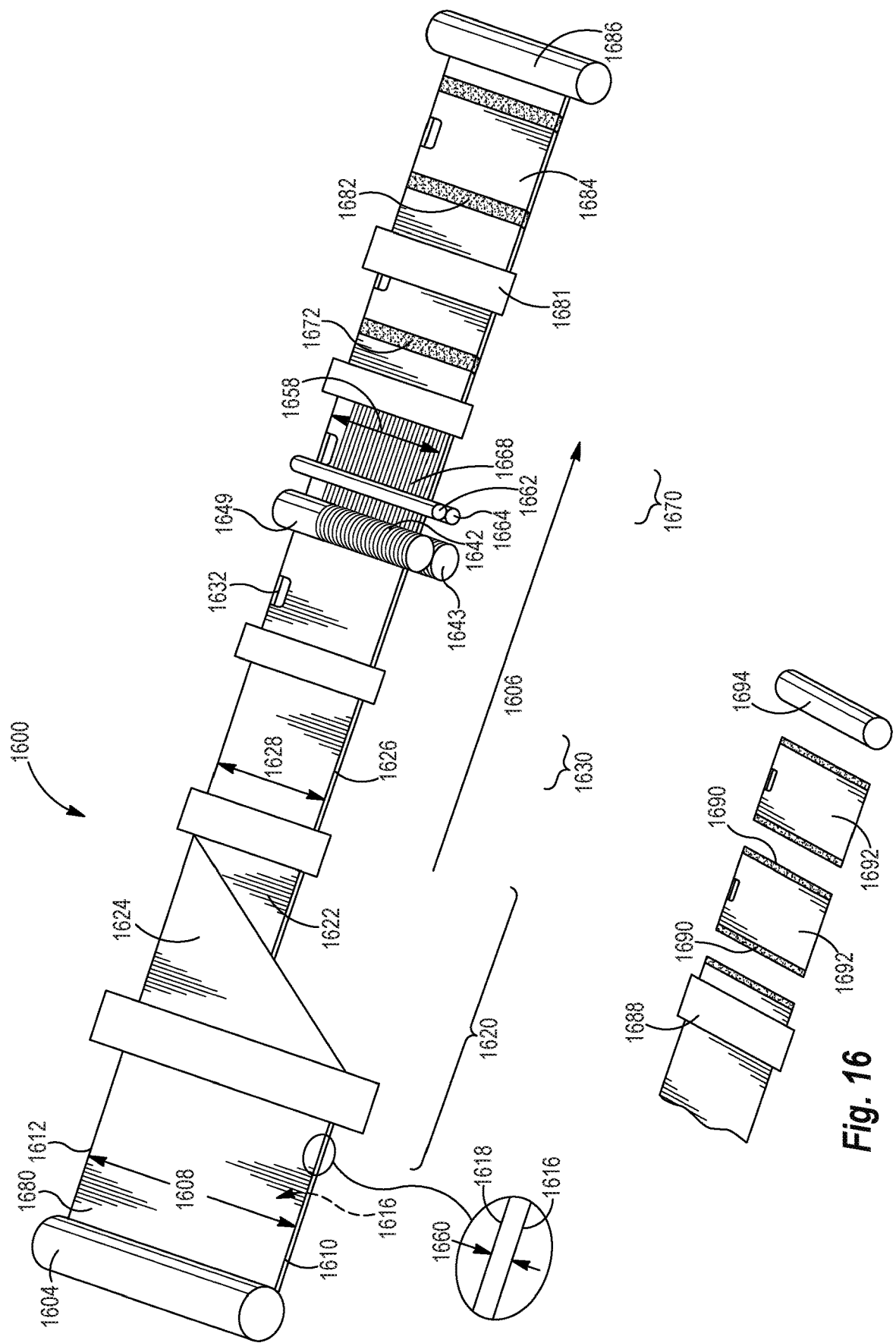
FIG. 16 illustrates a schematic diagram of a process for manufacturing bags with complex stretch patterns in accordance with one or more implementations of the present disclosure.

To produce a bag having a complex stretch pattern as described, continuous webs of thermoplastic material may be processed through a high-speed manufacturing environment such as that illustrated in FIG. 16. In the illustrated process 1600, production may begin by unwinding a first continuous web or film 1680 of thermoplastic sheet material from a roll 1604 and advancing the web along a machine direction 1606. The unwound web 1680 may have a width 1608 that may be perpendicular to the machine direction

1606, as measured between a first edge 1610 and an opposite second edge 1612. The unwound web 1680 may have an initial average thickness 1660 measured between a first surface 1616 and a second surface 1618. In other manufacturing environments, the web 1680 may be provided in other forms or even extruded directly from a thermoplastic forming process. To provide the first and second sidewalls of the finished bag, the web 1680 may be folded into a first half 1622 and an opposing second half 1624 about the machine direction 1606 by a folding operation 1620. When so folded, the first edge 1610 may be moved adjacent to the second edge 1612 of the web. Accordingly, the width of the web 1680 proceeding in the machine direction 1606 after the folding operation 1620 may be a width 1628 that may be half the initial width 1608. As may be appreciated, the portion mid-width of the unwound web 1680 may become the outer edge of the folded web. In any event, the hems may be formed along the adjacent first and second edges 1610, 1612 and a draw tape 1632 may be inserted during a hem and draw tape operation 1630.

To form a complex stretch pattern 1668, the processing equipment may include SELF'ing intermeshing rollers 1642, 1643 such as those described herein above. Referring to FIG. 16, the folded web 1680 may be advanced along the machine direction 1606 between the SELF'ing intermeshing rollers 1642, 1643, which may be set into rotation in opposite rotational directions to impart the resulting complex stretch pattern 1668. To facilitate patterning of the web 1680, the first roller 1642 and second roller 1643 may be forced or directed against each other by, for example, hydraulic actuators. The pressure at which the rollers are pressed together may be in a first range from 30 PSI (2.04 atm) to 100 PSI (6.8 atm), a second range from 60 PSI (4.08 atm) to 90 PSI (6.12 atm), and a third range from 75 PSI (5.10 atm) to 85 PSI (5.78 atm). In one or more implementations, the pressure may be about 80 PSI (5.44 atm).

In the illustrated implementation, the complex stretch pattern 1668 intermeshing rollers 1642, 1643 may be arranged so that they are co-extensive with or wider than the width 1608 of the folded web 180. In one or more implementations, the complex stretch pattern 1668 intermeshing rollers 1642, 1643 may extend from proximate the folded edge 1626 to the adjacent edges 1610, 1612. To avert imparting the complex stretch pattern 1668 onto the portion of the web that includes the draw tape 1632, the corresponding ends 1649 of the rollers 1642, 1643 may be smooth and without the ridges and grooves. Thus, the adjacent edges 1610, 1612 and the corresponding portion of the web proximate those edges that pass between the smooth ends 1649 of the rollers 1642, 1643 may not be imparted with the complex stretch pattern 1668.

More particularly, passing the thermoplastic film 1680 between a first intermeshing roller 1642 and a second intermeshing roller 1643, wherein at least one of the first intermeshing roller and the second intermeshing roller comprises a repeat unit of a plurality of ridges, a plurality of notches, and a plurality of grooves. The wherein the repeat unit causes creation of a complex stretch pattern in the thermoplastic film, the complex stretch pattern comprising a plurality of raised rib-like elements and a plurality of land areas positioned that extend in a first direction. The plurality of raised rib-like elements and the plurality of land areas are sized and positioned such that, when subjected to the applied force in the first direction, the thermoplastic film provides a low force extension The processing equipment may include pinch rollers 1662, 1664 to accommodate the width 1658 of the web 1680. To produce the finished bag, the processing equipment may further process the folded web with the complex stretch pattern. For example, to form the parallel side edges of the finished bag, the web may proceed through a sealing operation 1670 in which heat seals 1672 may be formed between the folded edge 1626 and the adjacent edges 1610, 1612. The heat seals may fuse together the adjacent halves 1622, 1624 of the folded web. The heat seals 1672 may be spaced apart along the folded web and in conjunction with the folded outer edge 1626 may define individual bags. The heat seals may be made with a heating device, such as, a heated knife. A perforating operation 1681 may perforate 1682 the heat seals 1672 with a perforating device, such as, a perforating knife so that individual bags 1690 may be separated from the web. In one or more implementations, the webs may be folded one or more times before the folded webs may be directed through the perforating operation. The web 1680 embodying the bags 1684 may be wound into a roll 1686 for packaging and distribution. For example, the roll 1686 may be placed in a box or a bag for sale to a customer.

In one or more implementations of the process, a cutting operation 1688 may replace the perforating operation 1680. The web is directed through a cutting operation 1688 which cuts the webs at location 1690 into individual bags 1692 prior to winding onto a roll 1694 for packaging and distribution. For example, the roll 1694 may be placed in a box or bag for sale to a customer. The bags may be interleaved prior to winding into the roll 1694. In one or more implementations, the web may be folded one or more times before the folded web is cut into individual bags. In one or more implementations, the bags 1692 may be positioned in a box or bag, and not onto the roll 1694.

Figure 17:
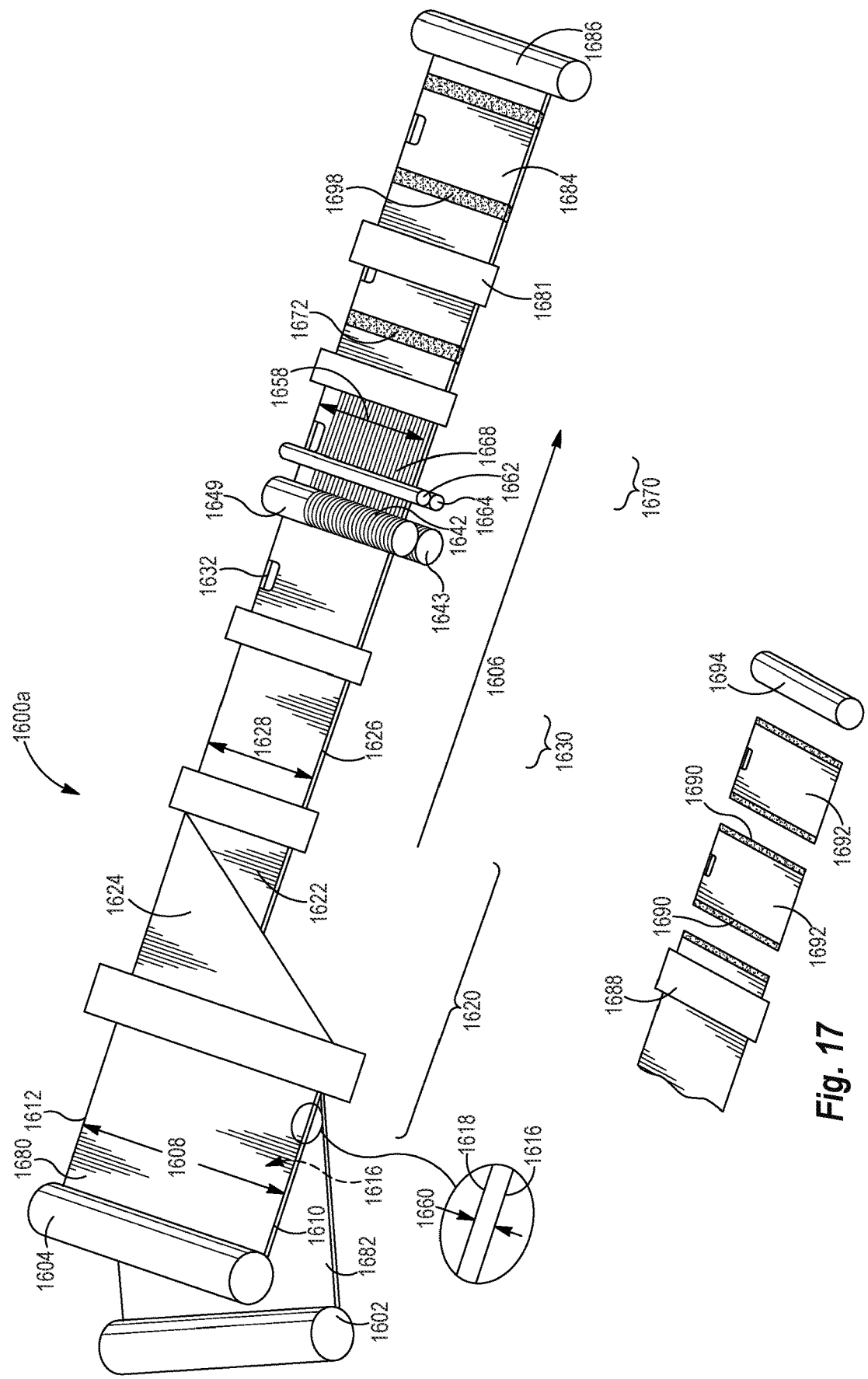
FIG. 17 illustrates a schematic diagram of a process for manufacturing thermoplastic bag with a complex stretch patterns with complex stretch patterns in accordance with one or more implementations of the present disclosure.

FIG. 17 illustrates a modified high-speed manufacturing 1600*a* that involves unwinding a second continuous web or film 1682 of thermoplastic sheet material from a roll 1602 and advancing the web along a machine direction 1606. The second film 1682 can comprise a thermoplastic material, a width, and/or a thickness that is similar or the same as the first film 1680. In alternative one or more implementations, one or more of the thermoplastic material, width, and/or thickness of the second film 1682 can differ from that of the first film 1680. The films 1680, 1682 can be folded together during the folding operation 1620 such that they pass through the SELF'ing intermeshing rollers 1642, 1643 together to form the complex stretch pattern and resulting multi-layered bags.

The following provides a procedure for generating stretch profiles as shown in FIGS. 10A-11B. The stretch profiles are obtained by using an Instron tensile test machine available from Instron Corporation of Canton, Mass. Samples used for this test are 1 inch wide×2 inches long with the long axis of the sample cut parallel to the direction of maximum extensibility of the sample. The sample should be cut with a sharp exacto knife or some suitably sharp cutting device design to cut a precise 1-inch wide sample. The sample should be cut so that an area representative of the symmetry of the overall pattern of the deformed region is represented. There will be cases (due to variations in either the size of the deformed portion or the relative configurations of the complex stretch patterns) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested.

The grips of the Instron consist of air actuated grips designed to concentrate the entire gripping force along a single line perpendicular to the direction of testing stress having one flat surface and an opposing face from which protrudes a half round to minimize slippage of the sample. The distance between the lines of gripping force should be 2 inches as measured by a steel rule held beside the grips. This distance will be referred to from hereon as the "gauge length." The sample is mounted in the grips with its long axis perpendicular to the direction of applied percent elongation. The crosshead speed is set to 10 in/min. The crosshead elongates the sample until the sample breaks at which point the crosshead stops and returns to its original position (0% elongation).

The present disclosure may be embodied in other specific forms without departing from its spirit or essential characteristics. For example, the illustrated and described implementations involve non-continuous (i.e., discontinuous or partially discontinuous lamination) to provide the weak bonds. In alternative implementations, the lamination may be continuous. For example, multi film layers could be co-extruded so that the layers have a bond strength that provides for delamination prior to film failure to provide similar benefits to those described above. Thus, the described implementations are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. A thermoplastic bag comprising:
a first sidewall and a second sidewall joined together along a first side edge, a second side edge, and a bottom edge;
an opening opposite the bottom edge;
a plurality of deformable areas in the first and second sidewalls, each deformable area comprising a plurality of raised rib-like elements, the plurality of raised rib-like elements extending in a first direction perpendicular to the first and second side edges; and
a plurality of land areas positioned about the plurality of deformable areas, the plurality of land areas comprising un-deformed portions of the first and second sidewalls, wherein at least 50 percent of the un-deformed portions extend in a second direction parallel to the first and second side edges;
wherein when the thermoplastic bag is subjected to an applied force in the second direction:
the plurality of land areas resist deformation in the second direction; and
the plurality of deformable areas forms a plurality of billows between the plurality of land areas as each respective plurality of raised rib-like elements expands under the applied force to form a billow extending outward from a plane of the respective first or second sidewall while adjacent land areas resist deformation.

2. The thermoplastic bag as recited in claim 1, wherein individual billows of the plurality of billows comprise one or more of heights greater than 3000 micrometers or widths greater than 3000 micrometers.

3. The thermoplastic bag as recited in claim 1, wherein each land area of the plurality of land areas further comprises a plurality of raised rib-like elements positioned between un-deformed portions thereof, each respective plurality of raised rib-like elements of the plurality of land areas extending in the first direction.

4. The thermoplastic bag as recited in claim 1, wherein the plurality of billows form as the plurality of deformable areas expand outward relative to the adjacent land areas as the un-deformed portions resist extension and rotation under the applied force.

5. The thermoplastic bag as recited in claim 3, wherein the plurality of land areas comprises a greater resistance to stretching relative to the plurality of deformable areas and lacks billows when the thermoplastic bag is subjected to the applied force in the second direction.

6. The thermoplastic bag as recited in claim 3, wherein:
each deformable area comprises a first pattern of raised rib-like elements comprising a macro pattern; and
each land area comprises a second pattern of raised rib-like elements comprising a micro pattern.

7. The thermoplastic bag of claim 1, wherein the first sidewall and the second sidewall comprise a low force extension between 0.04 and 0.12 inches per repeat unit when subjected to a tensile stress equal to between 300 and 350 pounds per square inch.

8. The thermoplastic bag as recited in claim 1, wherein when the thermoplastic bag is subjected to the applied force in the second direction parallel to the first and second side edges, the plurality of land areas do not rotate within the plane of the respective first and second sidewalls.

9. The thermoplastic bag as recited in claim 1, wherein the plurality of deformable areas that form the plurality of billows are at least partially surrounded by the adjacent land areas.

10. The thermoplastic bag as recited in claim 9, wherein the plurality of deformable areas and the plurality of land areas form a checkerboard pattern.

11. A multi-layer thermoplastic bag comprising:
a first sidewall comprising a first thermoplastic film layer and a second thermoplastic film layer;
a second sidewall comprising a third thermoplastic film layer and a fourth thermoplastic film layer;
a first side seal securing respective first side edges of the first and second sidewalls together;
a second side seal securing respective second side edges of the first and second sidewalls together;
a plurality of deformable areas in the first and second sidewalls, each deformable area comprising a plurality of raised rib-like elements, the plurality of raised rib-like elements having major axes extending in a first direction perpendicular to the first and second side edges and the plurality of raised rib-like elements being arranged in a repeating pattern; and
a plurality of land areas positioned about the plurality of deformable areas, the plurality of land areas comprising un-deformed portions of the first and second sidewalls, wherein at least 50 percent of the un-deformed portions have major axes extending in a second direction parallel to the first and second side edges,
wherein land areas of the plurality of land areas are discontinuous in the second direction being separated by deformable areas of the plurality of deformable areas, and
wherein when the multi-layer thermoplastic bag is subjected to an applied force in the second direction, the plurality of deformable areas forms a plurality of billows as each respective plurality of raised rib-like elements expands under the applied force to form a billow extending outward from a plane of the respective first or second sidewall while adjacent land areas resist deformation.

12. The multi-layer thermoplastic bag as recited in claim 11, wherein the plurality of billows form as the plurality of deformable areas expand outward relative to the adjacent land areas as the un-deformed portions resist extension and rotation under the applied force.

13. The multi-layer thermoplastic bag as recited in claim 11, wherein the plurality of raised rib-like elements of each deformable area is arranged in a first pattern of raised rib-like elements and each land area of the plurality of land areas comprises a plurality of raised rib-like elements positioned between un-deformed portions thereof, each respective plurality of raised rib-like elements of the plurality of land areas extending in the first direction and arranged in a second pattern of raised rib-like elements.

14. The multi-layer thermoplastic bag as recited in claim 11, wherein at least two deformable areas of the plurality of deformable areas that form billows are surrounded by adjacent land areas of the plurality of land areas.

15. The multi-layer thermoplastic bag as recited in claim 13, wherein areas of the first and second sidewalls comprising the second pattern of raised rib-like elements lack billows when the multi-layer thermoplastic bag is subjected to the applied force in the second direction.

16. The multi-layer thermoplastic bag as recited in claim 13, wherein:
the first pattern of raised rib-like elements comprises a macro pattern; and
the second pattern of raised rib-like elements comprises a micro pattern.

17. A thermoplastic bag comprising:
a first sidewall and a second sidewall joined together along a first side edge, a second side edge, and a bottom edge;
an opening opposite the bottom edge;
a plurality of deformable areas in the first and second sidewalls, each deformable area comprising a plurality of raised rib-like elements, the plurality of raised rib-like elements having major axes extending in a first direction perpendicular to the first and second side edges and the plurality of raised rib-like elements being arranged in a repeating pattern; and
a plurality of land areas positioned about the plurality of deformable areas, the plurality of land areas comprising un-deformed portions of the first and second sidewalls, wherein at least 50 percent of the un-deformed portions have major axes extending in a second direction parallel to the first and second side edges,
wherein land areas of the plurality of land areas are discontinuous in the second direction being separated by deformable areas of the plurality of deformable areas, and
wherein when the thermoplastic bag is subjected to an applied force in the second direction, the plurality of deformable areas forms a plurality of billows as each respective plurality of raised rib-like elements expands under the applied force to form a billow extending outward from a plane of the respective first or second sidewall while adjacent land areas resist deformation.

18. The thermoplastic bag as recited in claim 17, wherein when the thermoplastic bag is subjected to the applied force in the second direction, the plurality of land areas do not rotate.

19. The thermoplastic bag as recited in claim 17, wherein the plurality of raised rib-like elements of each deformable area is arranged in a first pattern of raised rib-like elements and wherein each land area of the plurality of land areas comprises a plurality of raised rib-like elements positioned between un-deformed portions thereof, each respective plurality of raised rib-like elements of the plurality of land areas extending in the first direction and arranged in a second pattern of raised rib-like elements.

20. The thermoplastic bag as recited in claim 19, wherein:
the first pattern of raised rib-like elements comprises a macro pattern; and
the second pattern of raised rib-like elements comprises a micro pattern.

* * * * *